(12) United States Patent
Yasutake et al.

(10) Patent No.: US 10,122,418 B2
(45) Date of Patent: Nov. 6, 2018

(54) COUPLING ASSISTANCE DEVICE AND RFID COMMUNICATION SYSTEM

(71) Applicant: Murata Manufacturing Co., Ltd., Nagaokakyo-shi, Kyoto-fu (JP)

(72) Inventors: Makoto Yasutake, Nagaokakyo (JP); Kunihiro Komaki, Nagaokakyo (JP); Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/835,832

(22) Filed: Dec. 8, 2017

(65) Prior Publication Data

US 2018/0102814 A1 Apr. 12, 2018

Related U.S. Application Data

(63) Continuation of application No. PCT/JP2016/069220, filed on Jun. 29, 2016.

(30) Foreign Application Priority Data

Jun. 30, 2015 (JP) .................................. 2015-131185
Jul. 10, 2015 (JP) .................................. 2015-138929

(51) Int. Cl.
*H04B 5/00* (2006.01)
*G06K 7/10* (2006.01)
*H01Q 7/06* (2006.01)

(52) U.S. Cl.
CPC ............. *H04B 5/0062* (2013.01); *G06K 7/10* (2013.01); *H01Q 7/06* (2013.01); *H04B 5/0081* (2013.01)

(58) Field of Classification Search
USPC .......................... 455/41.1; 320/108, 106, 109
See application file for complete search history.

(56) References Cited

U.S. PATENT DOCUMENTS 5,424,527 A * 6/1995 Takahira .......... G06K 19/07749
235/492
7,355,559 B2 * 4/2008 Tikhov ..................... H01Q 1/38
343/700 MS (Continued)

FOREIGN PATENT DOCUMENTS

JP    H10-293828 A    11/1998
JP    2006-48580 A    2/2006

(Continued)

OTHER PUBLICATIONS

International Search Report issued in International Application No. PCT/JP2016/069220, dated Aug. 23, 2016.

(Continued)

*Primary Examiner* — Nay A Maung
*Assistant Examiner* — Erica Fleming-Hall
(74) *Attorney, Agent, or Firm* — Arent Fox LLP

(57) ABSTRACT

A coupling assistance device is provided with a base material having a first principal surface, and a planar antenna provided at the base material. Moreover, the first principal surface of the base material has a first region to which a coil antenna of a portable telephone terminal is to be adjacent, and a second region to which a coil antenna of an RFID tag-containing article is to be adjacent. The planar antenna is provided from the first region over to the second region of the base material, and is coupled to the antenna of the portable telephone terminal in the first region and to the antenna of the RFID tag-containing article in the second region.

20 Claims, 21 Drawing Sheets

(56) References Cited

U.S. PATENT DOCUMENTS

| | | | |
|---|---|---|---|
| 8,305,036 B2* | 11/2012 | Toya | H02J 7/025 320/108 |
| 9,391,369 B2* | 7/2016 | Miura | G06K 7/10316 |
| 9,627,760 B2 | 4/2017 | Tsubaki | |
| 2004/0066169 A1* | 4/2004 | Bruning | H02J 7/025 320/108 |
| 2006/0109177 A1* | 5/2006 | Prieto-Burgos | H01Q 1/38 343/700 MS |
| 2006/0158152 A1* | 7/2006 | Taniguchi | H02J 7/025 320/106 |
| 2006/0208899 A1* | 9/2006 | Suzuki | G06K 7/10178 340/572.7 |
| 2007/0051807 A1* | 3/2007 | Yamaguchi | G06K 7/0008 235/451 |
| 2007/0182367 A1* | 8/2007 | Partovi | H01F 5/003 320/108 |
| 2008/0258679 A1* | 10/2008 | Manico | H02J 50/10 320/106 |
| 2013/0201074 A1* | 8/2013 | Harper | H01Q 1/38 343/866 |
| 2014/0218262 A1* | 8/2014 | Tsubaki | H01Q 7/00 343/867 |
| 2014/0253404 A1* | 9/2014 | Ikemoto | H01Q 1/40 343/788 |
| 2015/0136858 A1* | 5/2015 | Finn | G06K 19/07754 235/492 |
| 2015/0236550 A1* | 8/2015 | Yang | H02J 17/00 343/702 |
| 2015/0333389 A1* | 11/2015 | Orihara | H01Q 1/2225 343/788 |
| 2016/0118836 A1* | 4/2016 | Waldschmidt | H02J 7/025 320/108 |
| 2016/0372817 A1 | 12/2016 | Nakano | |
| 2016/0372818 A1 | 12/2016 | Nakano | |
| 2017/0255854 A1* | 9/2017 | Bhatia | G06K 19/0775 |
| 2018/0151951 A1* | 5/2018 | Ikemoto | H01Q 1/22 |

FOREIGN PATENT DOCUMENTS

| | | |
|---|---|---|
| JP | 2011-97375 A | 5/2011 |
| JP | 2011-103533 A | 5/2011 |
| JP | 2011-249935 A | 12/2011 |
| JP | 5660229 B2 | 1/2015 |
| JP | 2015-91007 A | 5/2015 |
| WO | WO 2013/073314 A1 | 5/2013 |
| WO | WO 2015/133503 A1 | 9/2015 |
| WO | WO 2015173294 A1 * | 11/2015 ........... H04B 5/0081 |

OTHER PUBLICATIONS

Written Opinion of the International Searching Authority issued in International Application No. PCT/JP2016/069220, dated Aug. 23, 2016.

* cited by examiner

PRIOR ART

US 10,122,418 B2

COUPLING ASSISTANCE DEVICE AND RFID COMMUNICATION SYSTEM

CROSS REFERENCE TO RELATED APPLICATIONS

The present application is a continuation of PCT/JP2016/069220 filed Jun. 29, 2016, which claims priority to Japanese Patent Application No. 2015-131185, filed Jun. 30, 2015, and Japanese Patent Application No. 2015-138929, filed Jul. 10, 2015, the entire contents of each of which are incorporated herein by reference.

TECHNICAL FIELD

The present disclosure relates to an RFID system and a coupling assistance device used for the RFID system.

BACKGROUND

In recent years, a portable communication device such as a portable telephone terminal has been provided with a circuit applicable to an RFID system in a high frequency (HF) band, and a communication terminal device has come into widespread use as a reader and writer or an RFID tag. However, with the reduction in the size and the increase in the function of a communication terminal, it is often difficult to provide a sufficient space for a coil antenna large enough to obtain a high gain, in a housing of such a communication terminal. In view of the foregoing, Patent Literature 1 (identified below) discloses a relay antenna to be arranged so as to extend in the upper direction of a portable telephone. This relay antenna is an auxiliary antenna for increasing a communication distance. In addition, Patent Literature 2 (identified below) discloses that a coil antenna is provided in a jacket to be attached to a portable communication device.

Patent Literature 1: Japanese Unexamined Patent Application Publication No. 2006-048580.

Patent Literature 2: Japanese Patent No. 5660229.

Since a display panel or an operation portion are arranged in the front of a portable communication device, the above coil antenna is arranged on the rear face side of the device so as not to be affected by the display panel or the operation portion. In addition, in a case of communicating by holding a portable communication device over a reading portion of a communication partner device, such as a reader and writer, it is reasonable that a communication surface of the portable communication device is on the back side of a housing.

However, when an RFID tag is provided as a communication partner and an RFID tag-containing article containing the RFID tag are much smaller than a portable communication device, it is often difficult to align the portable communication device with the RFID tag-containing article, as will be described below. In other words, when an RFID tag-containing article is much smaller than a portable communication device, a user holds the portable communication device in one hand and holds the RFID tag-containing article in the other hand, and has to rub the RFID tag-containing article against the rear face of the portable communication device. In this scenario, since it is necessary to confirm whether or not communication has been established, the user has to perform an operation with the RFID tag-containing article hidden on the rear surface (surface on the opposite side of a display surface) of the portable communication device, while looking at the screen of the portable communication device.

FIG. 21 is a view of a state in which an RFID tag-containing article is hidden on the rear surface of a portable communication device. When a small-sized RFID tag-containing article 300 is brought close to a portable telephone terminal 200 from the side of a surface opposite to a display surface Sd of the portable telephone terminal 200, and a reading region (readable range) RA is small, the user has to move a position of the RFID tag-containing article 300 to find a position in which communication is possible until displayed content changes. In particular, a portable communication device with a small readable range needs time to establish communication.

In this manner, an inconvenience has arisen such that whether or not communication is established is not able to be determined unless the display of the screen is confirmed or such that, when positions have to be aligned, an operation has to be performed from a side on which the screen is not seen.

In addition, since the readable range of an RFID tag varies for each model of a portable communication device, an RFID tag-containing article has to be brought close by use of a mark that shows a reading position as a guide, the mark being attached to the back side of a device, and such an operation requires experience.

While, in the above examples, the portable communication device functioning as a reader and writer and an RFID tag communicate with each other, a similar inconvenience is also caused in a case in which a first device functioning as a reader and writer and a second device functioning as an RFID tag communicate with each other. Each of the first device and the second device conceptually includes, for example, a portable telephone terminal or a single RFID tag.

SUMMARY OF THE INVENTION

In view of the foregoing, exemplary embodiments of the present invention are directed to solve the above inconveniences and provide a coupling assistance device capable of simplifying an operation for RFID communication between a first device and a second device and an RFID communication system using such a coupling assistance device.

A coupling assistance device according to an exemplary embodiment includes a base material (i.e., a "base") that includes a first principal surface and a planar antenna that is provided at the base material. Moreover, the first principal surface of the base material includes a first region in which a first device provided with a first antenna is to be placed; and a second region in which a second device provided with a second antenna is to be placed. In the exemplary aspect, the first region and the second region are arranged at a distance such that, in a state in which the first antenna is adjacent to the first region and the second antenna is adjacent to the second region, the first device and the second device are able to be simultaneously arranged on the first principal surface of the base material. Moreover, the planar antenna is provided from the first region of the base material over to the second region of the base material, and is coupled to the first antenna in the first region and coupled to the second antenna in the second region.

With the above configuration, the first device and the second device communicate with each other through the coupling assistance device. Since the first device and the second device are able to be simultaneously arranged on the first principal surface of a base material, it is not necessary to rub the second device such as a small RFID tag-containing article for example against on the back side of the first device such as a portable telephone terminal for example. As a result, it is possible to easily confirm establishment of communication by arranging the second device while looking at the display screen of the first device.

In a refinement of the exemplary embodiment, the planar antenna may preferably configure at least a portion of a resonance circuit that resonates in a frequency band in which the first device and the second device communicate. Accordingly, since the coupling assistance device has a high Q value and is used in a low loss state, despite the spatial distance between the first device and the second device is large, communication is able to be established in an insertion loss state.

In a further refinement of the exemplary embodiments, a magnetic layer may be preferably provided at a surface of the planar antenna on an opposite side of a surface of the planar antenna to which the first device and the second device are to be adjacent. Such a configuration, even when a conductor, such as a metal object, is present on the surface (second principal surface) on the side opposite to the first principal surface of the base material, is not easily affected by the conductor; significantly reduces or prevents loss due to occurrence of an eddy current of the conductor, the variance of the resonant frequency of the resonance circuit, or the like; and is able to obtain stable characteristics.

In a further refinement of the exemplary embodiments, a portion corresponding to the first region of the planar antenna may preferably be a first coil with a winding axis that extends in a normal direction of the first principal surface of the base material; a portion corresponding to the second region of the planar antenna may preferably be a second coil with a winding axis that extends in the normal direction of the first principal surface of the base material; and the planar antenna may preferably be configured by the first coil, the second coil, and a connecting portion connecting the first coil and the second coil. Accordingly, the antenna of the first device and the first coil are stably coupled to each other over a wide range of the first region to which the antenna of the first device is adjacent.

Moreover, in this embodiment, each of the first coil and the second coil may preferably be a spiral-shaped coil. Accordingly, the first coil and the second coil are able to be formed on a substantially single surface and are also able to be reduced in thickness. In addition, when the first coil is coupled to the first antenna of the first device, or when the second coil is coupled to the second antenna of the second device, a region in which the coils are able to be coupled to the antennas, in a plane direction, is provided widely.

In another exemplary aspect, an inside diameter of the first coil may preferably be less than or equal to one-fourth of an outside diameter of the first coil. Accordingly, the required accuracy of the adjacent (arranged) position of the first device with respect to the first region is reduced.

In a refinement of this aspect, the first coil may preferably include a conductor pattern of which a line space is larger than a line width of the conductor pattern. Accordingly, more magnetic fluxes pass through the line space, and the antenna of the first device and the first coil are more stably coupled to each other over a wide range of the first region.

In a further refinement of the exemplary embodiments, winding directions of the first coil and the second coil may preferably be directions such that polarities of an induction current have the same phase when magnetic fluxes penetrating the first coil and the second coil extend in the same direction. Accordingly, in a state in which the coil opening surface of the antenna of the first device and the coil opening surface of the first coil face each other and the coil opening surface of the antenna of the second device and the coil opening surface of the second coil face each other, since the magnetic field coupling in the first region and the magnetic field coupling in the second region do not interfere with each other, and a null point does not occur between the first region and the second region, the required accuracy of the adjacent (arranged) position of the first device with respect to the first region and the required accuracy of the adjacent (arranged) position of the second device with respect to the second region are reduced.

In a further refinement of the exemplary embodiments, an area of a region defined by the connecting portion may preferably be smaller than an area of a region in which the first coil is provided and an area of a region in which the second coil is provided. Accordingly, the region defined by the connecting portion is not easily affected by another unnecessary magnetic flux, and unnecessary coupling between the connecting portion and another conductor adjacent to the region defined by the connecting portion is difficult to occur.

In a further refinement of the exemplary embodiments, a planar conductor that covers a region between the first coil and the second coil and includes a removed portion at a position facing a coil opening of the first coil and a coil opening of the second coil may preferably be provided, and winding directions of the first coil and the second coil are directions such that polarities of an induction current have a same phase when magnetic fluxes penetrating the first coil and the second coil extend in opposite directions. Accordingly, magnetic fluxes are able to be converged to the region in which the first coil is formed and the region in which the second coil is formed, and a communication distance is able to be increased. In addition, since a planar conductor is positioned between the first device and the second device, even when a distance between the coupling assistance device and the first device and a distance between the coupling assistance device and the second device vary, in a case in which the planar antenna configures at least a portion of the resonance circuit, the resonant frequency is not easily varied. Furthermore, a null point is difficult to occur with respect to the positional shift in the in-plane direction of the first device to the region in which the first coil is formed or the positional shift in the in-plane direction of the second device to the region in which the second coil is formed.

In yet a further refinement of the exemplary embodiments, the first coil may preferably be larger than the second coil. Accordingly, the first device with a large antenna is brought close to the first region and the second device with a small antenna is brought close to the second region, and thereby the antennas and the regions are respectively coupled to each other with a high degree of coupling, which significantly reduces or prevents insertion loss of the coupling assistance device.

In a further exemplary aspect, the base material may preferably further include a first fixing portion configured to fix the first device at a position at which the first antenna is adjacent to the first region; and a second fixing portion configured to fix the second device at a position at which the second antenna is adjacent to the second region. With this configuration, the positioning of the first device and the second device with respect to the base material becomes easy.

In a further refinement of the exemplary embodiments, the base material may preferably include a flexible member or a hinge member between the first region and the second region, the flexible member being capable of adjusting an angle between a surface of the first region and a surface of the second region, the hinge member being capable of folding the first region and the second region. Accordingly, when being not used for relay, the base material is bent between the first region and the second region and is thus able to be reduced in size.

In another aspect, the base material may preferably configure a flip cover type case that includes an attaching portion to which the first device is to be attached and a placing portion on which the second device is to be placed. Accordingly, the second device is arranged (placed) on the base material to which the first device is attached, which makes it possible to communicate easily.

In another exemplary aspect, an RFID communication system is disclosed that includes a first device that includes a first antenna; a second device that includes a second antenna; and a coupling assistance device that is configured to be coupled to the first antenna and the second antenna. Moreover, the coupling assistance device includes a base material (or base) that includes a first principal surface; and a planar antenna that is provided at the base material. In this aspect, the first principal surface of the base material includes a first region in which the first device is to be placed; and a second region in which the second device is to be placed. Furthermore, the first region and the second region are arranged at a distance such that, in a state in which the first antenna is adjacent to the first region and the second antenna is adjacent to the second region, the first device and the second device are able to be simultaneously arranged on the first principal surface of the base material. In addition, the planar antenna is provided from the first region of the base material over to the second region of the base material, and is coupled to the first antenna in the first region and coupled to the second antenna in the second region.

With the above configuration, only by making the first device and the second device adjacent to (arranged in) the first principal surface of the coupling assistance device, the first device and the second device are able to easily communicate with each other through the coupling assistance device.

In a refinement of the exemplary embodiment, the first device may preferably be a portable communication terminal that includes a first principal surface; a second principal surface being an opposite surface of the first principal surface of the first device; and a display surface on the first principal surface of the first device. Moreover, the first antenna can be positioned near the second principal surface of the first device; and the first device may preferably be to be placed in the first region so that the second principal surface of the first device faces the first region. With the above configuration, only by making a portable communication terminal, such as a portable telephone terminal, for example, adjacent to (arranged in) the first region, and making a small article containing an RFID tag, for example, adjacent to (placed in) the second region while the display screen of the portable communication terminal is confirmed, it becomes possible to communicate easily.

In a refinement of the exemplary embodiment, an outline of the second device may be preferably be smaller than an outline of the first device; and an outline of the second antenna may be preferably be smaller than an outline of the first antenna. Accordingly, two devices having different sizes are able to easily communicate with each other through the coupling assistance device.

In a refinement of the exemplary embodiment, a portion corresponding to the first region of the planar antenna may preferably be a first coil with a winding axis that extends in a normal direction of the first principal surface of the base material; and a portion corresponding to the second region of the planar antenna may preferably be a second coil with a winding axis that extends in the normal direction of the first principal surface of the base material. With this configuration, the first antenna and the second antenna are coupled to the planar antenna with a high degree of coupling and are able to communicate in a low insertion loss state.

In another refinement of the exemplary embodiment, the planar antenna may preferably be configured by the first coil, the second coil, and a connecting portion connecting the first coil and the second coil. Moreover, an area of a region defined by the connecting portion may preferably be smaller than an area of a region in which the first coil is provided and an area of a region in which the second coil is provided.

With the above configuration, the region defined by the connecting portion is not easily affected by another unnecessary magnetic flux, and unnecessary coupling between the connecting portion and another conductor adjacent to the region defined by the connecting portion is difficult to occur.

In a refinement of the exemplary embodiment, a planar conductor that covers a region between the first coil and the second coil and includes a removed portion at a position facing a coil opening of the first coil and a coil opening of the second coil may preferably be provided. Moreover, winding directions of the first coil and the second coil may preferably be directions such that polarities of an induction current have the same phase when magnetic fluxes penetrating the first coil and the second coil extend in opposite directions.

With the above configuration, magnetic fluxes are able to be converged to the region in which the first coil is formed and the region in which the second coil is formed, and a communication distance between the first device and the second device is able to be increased. In addition, since a planar conductor is positioned between the first device and the second device, even when a distance between the coupling assistance device and the first device and a distance between the coupling assistance device and the second device vary, in a case in which the planar antenna configures at least a portion of the resonance circuit, the resonant frequency is not easily varied. Furthermore, a null point is difficult to occur with respect to the positional shift in the in-plane direction of the first device to the region in which the first coil is formed or the positional shift in the in-plane direction of the second device to the region in which the second coil is formed.

In yet another refinement of the exemplary embodiment, an aspect ratio of the first coil may preferably be different from an aspect ratio of the first antenna. Accordingly, the resonant frequency of the resonance circuit including the planar antenna 10 is stabilized, and a coupling assistance device of which the characteristics are stabilized is obtained.

In another refinement of the exemplary embodiment, the first antenna may preferably be an antenna of an RFID reader and writer; and the second antenna may preferably be an antenna of an RFID tag. For example, when an RFID communication portion of a portable communication terminal is operated in a reader and writer mode, the portable communication terminal is able to easily read and write in an RFID tag.

According to various exemplary embodiments of the present invention, a first device and a second device are able to be simultaneously arranged on the first principal surface of a base material. Advantageously, the second device is able to be arranged while the display screen of the first device is viewed and confirmed, and thus communication between the first device and the second device is able to be started easily.

DETAILED DESCRIPTION OF EXEMPLARY EMBODIMENTS

Figure 1:
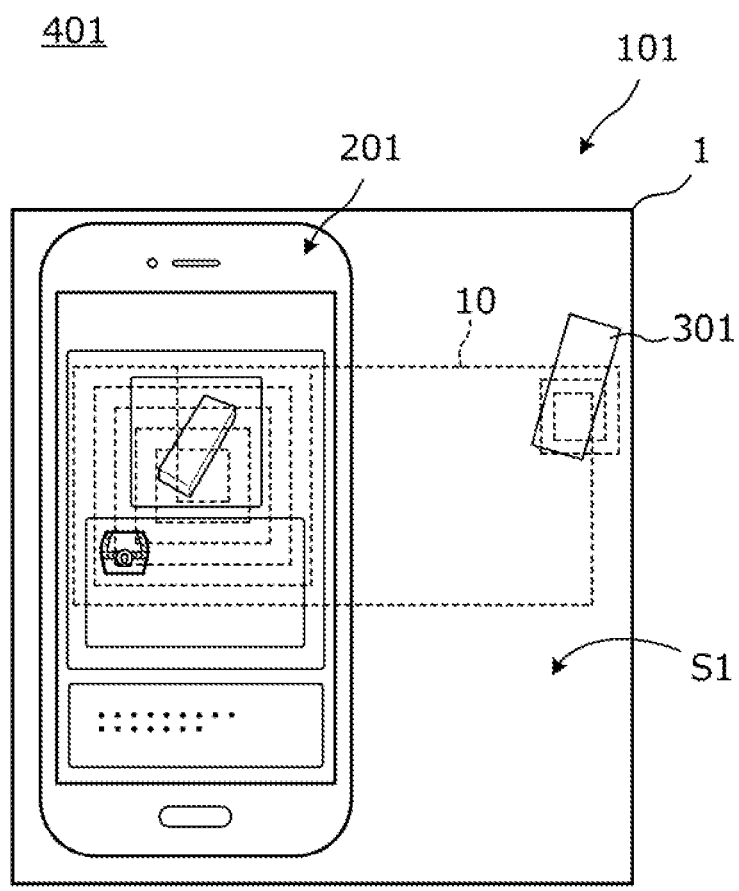
FIG. 1 is a view of a configuration of a coupling assistance device 101 according to a first exemplary embodiment, and a configuration of an RFID communication system configured by this coupling assistance device, a portable telephone terminal, and an RFID tag-containing article.

Hereinafter, a plurality of exemplary embodiments of the present invention will be described with reference to the attached drawings and several specific examples. In the drawings, the same components and elements are denoted by the same reference signs. While exemplary embodiments are divided and described for the sake of convenience in consideration of easiness of description or understanding of main points, constituent elements described in different preferred embodiments are able to be partially replaced and combined with each other. In exemplary embodiments after the first exemplary embodiment, a description of features common to the first exemplary embodiment will be omitted, and different features are primarily described. In particular, a description of similar operational effects achieved by similar structures will not be repeated in each exemplary embodiment.

First Exemplary Embodiment

Figure 2:
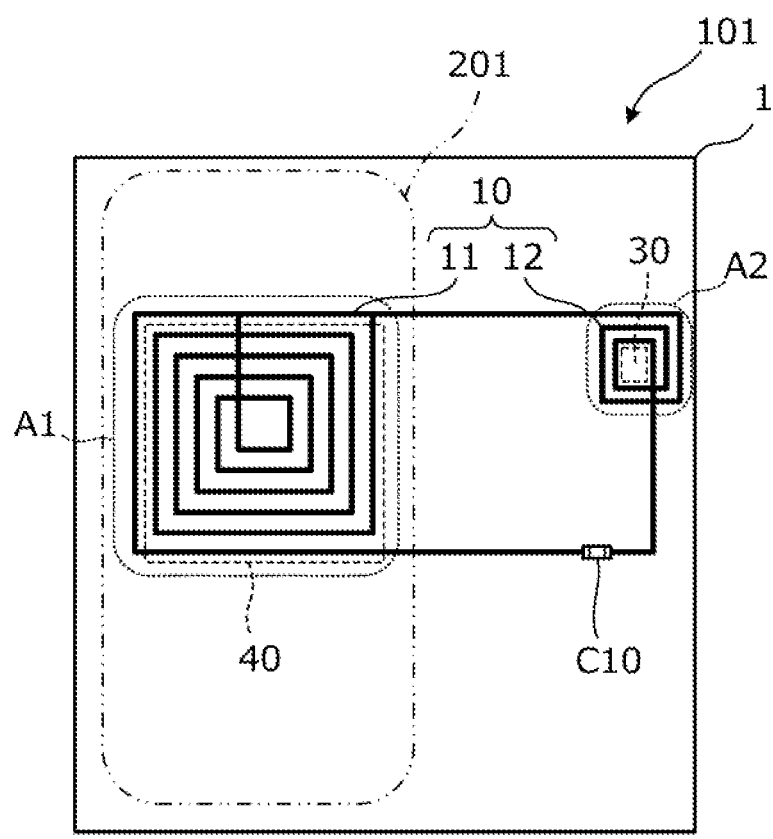
FIG. 2 is a view of a first region and a second region on a base material.
Figure 3A:
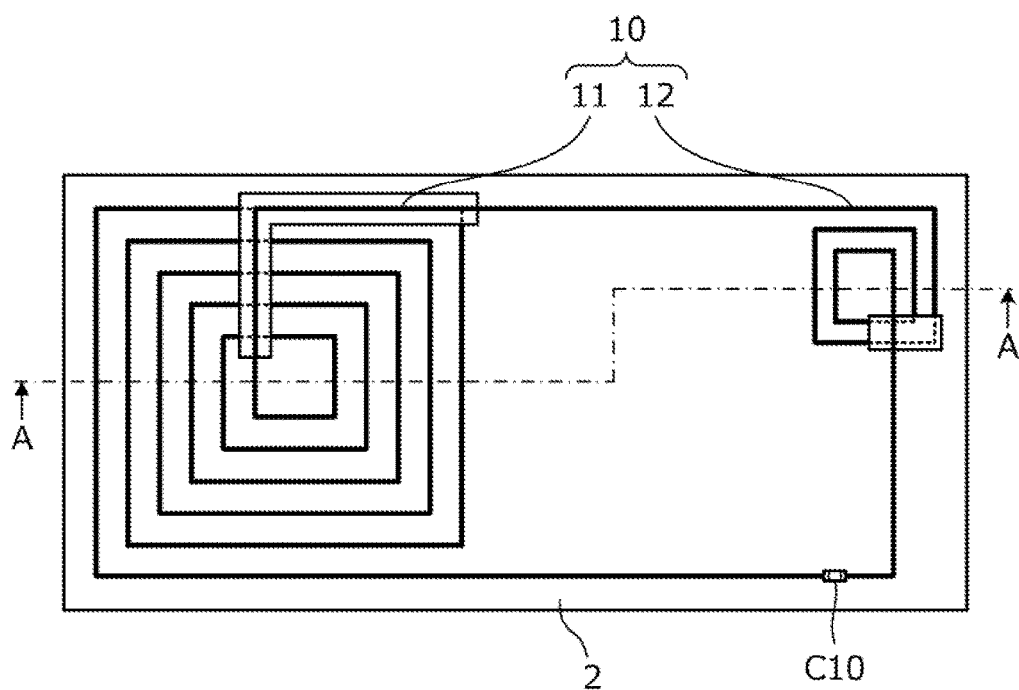
FIG. 3A is a plan view of a configuration of a planar antenna formed on a circuit board.
Figure 3B:
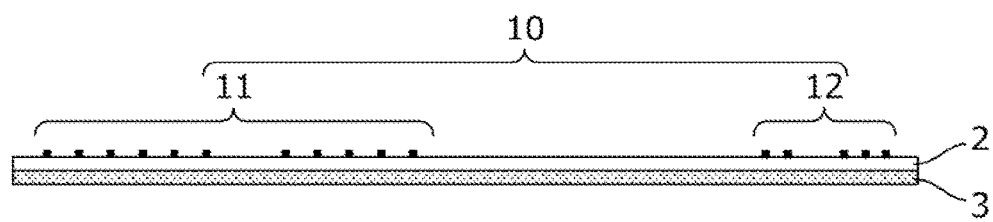
FIG. 3B is a cross-sectional view of an A-A portion of FIG. 3A.

FIG. 1 is a view of a configuration of a coupling assistance device 101 according to a first exemplary embodiment, and a configuration of an RFID communication system 401 configured by this coupling assistance device 101, a portable telephone terminal 201, and an RFID tag-containing article 301. FIG. 2 is a view of a first region A1 and a second region A2 on a base material 1 or simply a "base" (the terms are used interchangeably). FIG. 3A is a plan view of a configuration of a planar antenna 10 formed on a circuit board 2, and FIG. 3B is a cross-sectional view of an A-A portion of FIG. 3A.

In the first exemplary embodiment, the portable telephone terminal 201 is an example of a first device according to the present disclosure, and the RFID tag-containing article 301 is an example of a second device according to the present disclosure. The first exemplary embodiment describes a so-called game application of the portable telephone terminal 201 is executed by use of the RFID tag-containing article 301.

Although not shown in FIG. 1, a positioning mark that shows a position at which the RFID tag-containing article 301 is to be placed is previously provided in the coupling assistance device 101. This mark indicates a position or a position range in which the best communication is made when the RFID tag-containing article 301 is placed in the position or the position range. In addition, the coupling assistance device 101 may be provided with a fixing portion that fixes the RFID tag-containing article 301 so that the RFID tag-containing article 301 may be placed in an optimal position.

In this RFID communication system 401, during the execution of a game application, for example, by placing the RFID tag-containing article 301 in the position of the above mark, the details of an RFID tag are read, a game is developed according to the details, and predetermined data is written in the RFID tag when necessary.

Inside the base material 1 of the coupling assistance device 101, the circuit board 2 shown in FIG. 3A and FIG. 3B is contained. Preferably, the base material 1 is a thin plate-shaped base material, and has a first principal surface S1 including: the first region A1 to which a coil antenna of the portable telephone terminal 201 is adjacent; and the second region A2 to which a coil antenna of the RFID tag-containing article 301 is adjacent. In FIG. 2, the outline of a coil antenna 40 of the portable telephone terminal 201 is shown. Similarly, the outline of a coil antenna 30 of the RFID tag-containing article 301 is also shown.

The planar antenna 10 is provided from the first region A1 of the base material 1 over to the second region A2 of the base material 1. In the first exemplary embodiment, the circuit board 2 includes a first coil 11 and a second coil 12. The first coil 11 may be a spiral-shaped coil corresponding to the first region Al, and the second coil 12 may be a spiral-shaped coil corresponding to the second region A2. The first coil 11 and the second coil 12 are connected in series through a capacitor C10 for resonance. In this example, the capacitor C10 for resonance is a chip capacitor mounted on the circuit board 2.

According to the exemplary embodiment, the winding directions of the first coil 11 and the second coil 12 may be directions such that the polarities of an induction current have the same phase when magnetic fluxes penetrating the first coil 11 and the second coil 12 have the same phase.

The inside diameter of the first coil 11 may be less than or equal to one-fourth of the outside diameter of the first coil 11. Since this example shows a rectangular spiral shape, the "inside diameter" is a width of a rectangle that the innermost conductor pattern defines, and the "outside diameter" is a width of the rectangle that the outermost conductor pattern defines.

As shown in FIG. 3B, a magnetic layer 3 may be provided at a surface of the planar antenna 10 on the side opposite to a surface (surface on the side of first principal surface S1 of the base material 1) of the planar antenna 10 to which the portable telephone terminal 201 and the RFID tag-containing article 301 are adjacent. The magnetic layer 3 may be, for example, a magnetic ferrite sheet, and is attached to the back side of the circuit board 2 in the first exemplary embodiment.

The first region A1 and the second region A2 are arranged at a distance such that, in a state where the coil antenna 40 of the portable telephone terminal 201 is adjacent to the first region A1 and the coil antenna 30 of the RFID tag-containing article 301 is adjacent to the second region A2, the portable telephone terminal 201 and the RFID tag-containing article 301 are able to be simultaneously arranged on the first principal surface S1.

Figure 4:
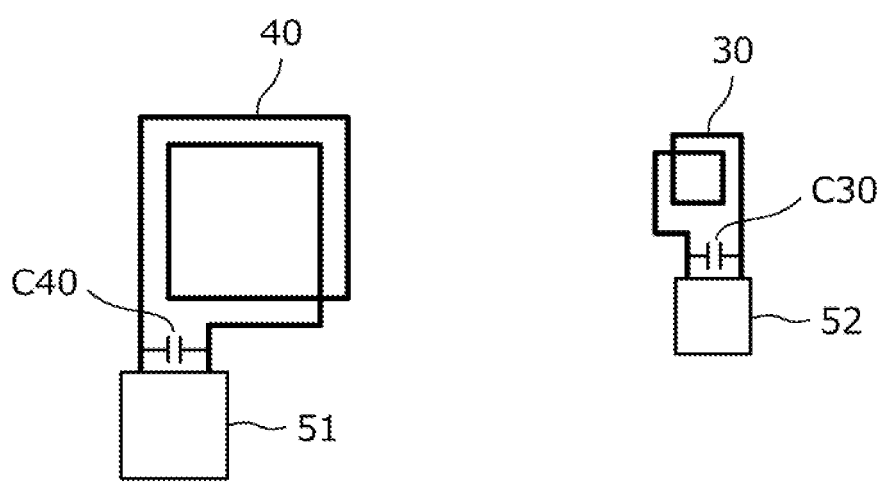
FIG. 4 is a view of a configuration of an RFID circuit of a portable telephone terminal, and an RFID circuit of an RFID tag-containing article.

FIG. 4 is a view of a configuration of an RFID circuit of the portable telephone terminal 201, and an RFID circuit of the RFID tag-containing article 301. The portable telephone terminal 201 is provided with a coil antenna 40, a capacitor C40 for resonance, and an RFIC 51. The coil antenna 40 and the capacitor C40 for resonance configure an RFID circuit of the portable telephone terminal 201. The resonant frequency of a resonance circuit configured by this coil antenna 40 and the capacitor C40 for resonance is set at or near a communication frequency. The RFID tag-containing article 301 is provided with a coil antenna 30, a capacitor C30 for resonance, and an RFIC 52. The coil antenna 30 and the capacitor C30 for resonance configure an RFID circuit of the RFID tag-containing article 301. The resonant frequency of a resonance circuit configured by this coil antenna 30 and the capacitor C30 for resonance is set at or near a communication frequency.

Figure 5:
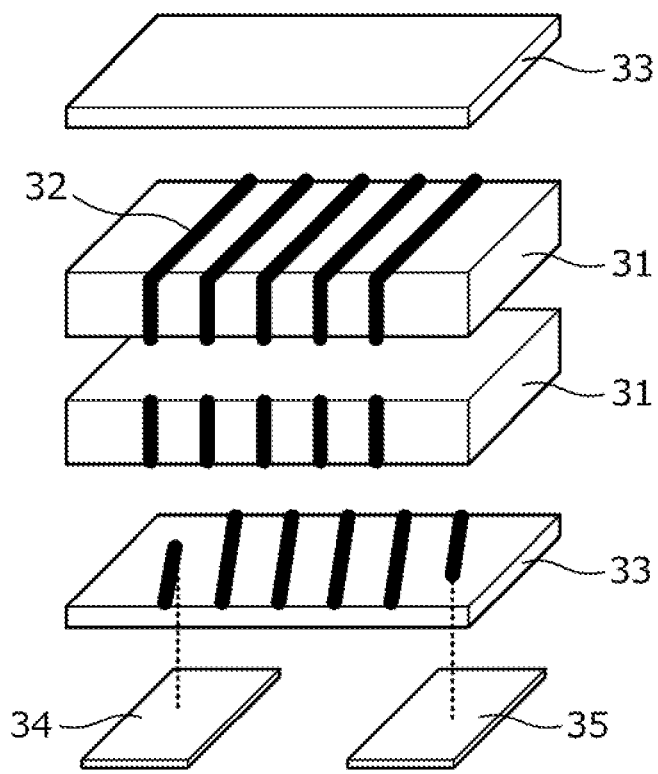
FIG. 5A is an exploded perspective view of a coil antenna.
FIG. 5B is a front view of the coil antenna.
Figure 5:
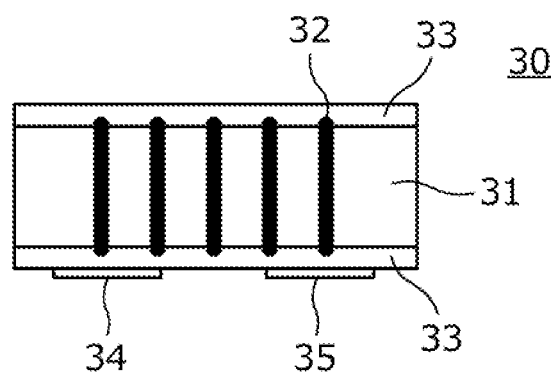

The following is an example of a coil antenna with which the RFID tag-containing article 301 is provided. In one aspect, it is advantageous to incorporate a small coil antenna in order to use a small article as an RFID tag-containing article. FIG. 5A is an exploded perspective view of the coil antenna 30, and FIG. 5B is a front view of the coil antenna 30. This coil antenna 30 is a stacked body of a magnetic layer 31 and a nonmagnetic layer 33 on which a coil conductor 32 is provided. The magnetic layer 31 may preferably be composed of a magnetic ferrite and the nonmagnetic layer 33 may preferably be composed of a dielectric (nonmagnetic ferrite). While FIG. 5A and FIG. 5B illustrate a single feeding coil cut out from a mother substrate, a portion of the coil conductor 32 that is provided on an end surface of the magnetic layer 31, in a state before the mother substrate is cut, corresponds to a via hole filled with a conductor. Input and output terminals 34 and 35 that are electrically connected to the coil conductor 32 are provided on the bottom surface of the lower nonmagnetic layer 33. This coil antenna 30 is arranged in an article so that the coil winding axis of the coil antenna 30 may be in parallel with the coil winding axis of the second coil 12 (or may be perpendicular to the first principal surface S1 of the base material 1).

As shown in FIG. 2, the coil antenna 40 of the portable telephone terminal 201 is magnetically coupled to the first coil 11, and the coil antenna 30 of the RFID tag-containing article 301 is magnetically coupled to the second coil 12.

Thus, the portable telephone terminal 201 is placed in the first region A1 of the base material 1 and the RFID tag-containing article 301 is placed in the second region A2 of the base material 1, so that the portable telephone terminal 201 and the RFID tag-containing article 301 communicate with each other through the coupling assistance device 101. For example, it is advantageously not necessary to rub the RFID tag-containing article 301 against on the back side of the portable telephone terminal 201, and it is possible to easily confirm establishment of communication by arranging the RFID tag-containing article 301 while looking at the display screen of the portable telephone terminal 201.

It is noted that the base material 1 may preferably include a first fixing portion that fixes the portable telephone terminal 201 at a position at which the coil antenna 40 of the portable telephone terminal 201 is adjacent to the first region A1, and a second fixing portion that fixes the RFID tag-containing article 301 at a position at which the coil antenna 30 of the RFID tag-containing article 301 is adjacent to the second region A2. With this configuration, the positioning of the portable telephone terminal 201 and the RFID tag-containing article 301 with respect to the base material 1 becomes easy.

The present exemplary embodiment provides the following effects and technical advantages.

Since the first coil 11 is a spiral-shaped conductor pattern and the inside diameter of the first coil 11 is less than or equal to one-fourth of the outside diameter of the first coil 11, magnetic flux is distributed over the wide range of the first coil. Thus, the coil antenna 40 of the portable telephone terminal 201 and the first coil 11 are stably coupled to each other over the wide range of the first region A1 to which the coil antenna 40 of the portable telephone terminal 201 is adjacent. Accordingly, the required accuracy of the adjacent (arranged) position of the portable telephone terminal with respect to the first region A1 is reduced.

Since the first coil 11 includes a conductor pattern of which the line space is larger than the line width of the conductor pattern, more magnetic fluxes pass through the line space, and the antenna of the first device and the first coil are more stably coupled to each other over the wide range of the first region.

The first coil 11 and the second coil 12 may be each spiral-shaped conductor patterns, and the winding directions of the first coil 11 and the second coil 12 may be directions such that the polarities of an induction current have the same phase when magnetic fluxes penetrating the first coil 11 and the second coil 12 have the same phase. Accordingly, in a state where the coil opening surface of the coil antenna 40 of the portable telephone terminal 201 and the coil opening surface of the first coil 11 face each other and the coil opening surface of the coil antenna 30 of the RFID tag-containing article 301 and the coil opening surface of the second coil 12 face each other, the magnetic field coupling in the first region A1 and the magnetic field coupling in the second region A2 are not likely to interfere with each other.

The first coil 11 may preferably be larger than the second coil 12. Accordingly, the portable telephone terminal 201 with a large coil antenna is brought close to the first region Al and the RFID tag-containing article 301 with a small coil antenna is brought close to the second region A2, and thereby each of them is coupled with a high degree of coupling, which significantly reduces or prevents insertion loss of the coupling assistance device 101.

Second Exemplary Embodiment

In a second exemplary embodiment, a description is made of several examples of a planar antenna 10 having a different pattern. Each of FIG. 6, FIG. 7, and FIG. 8 is a plan view of a configuration of a planar antenna 10 formed on a circuit board 2.

Figure 6:
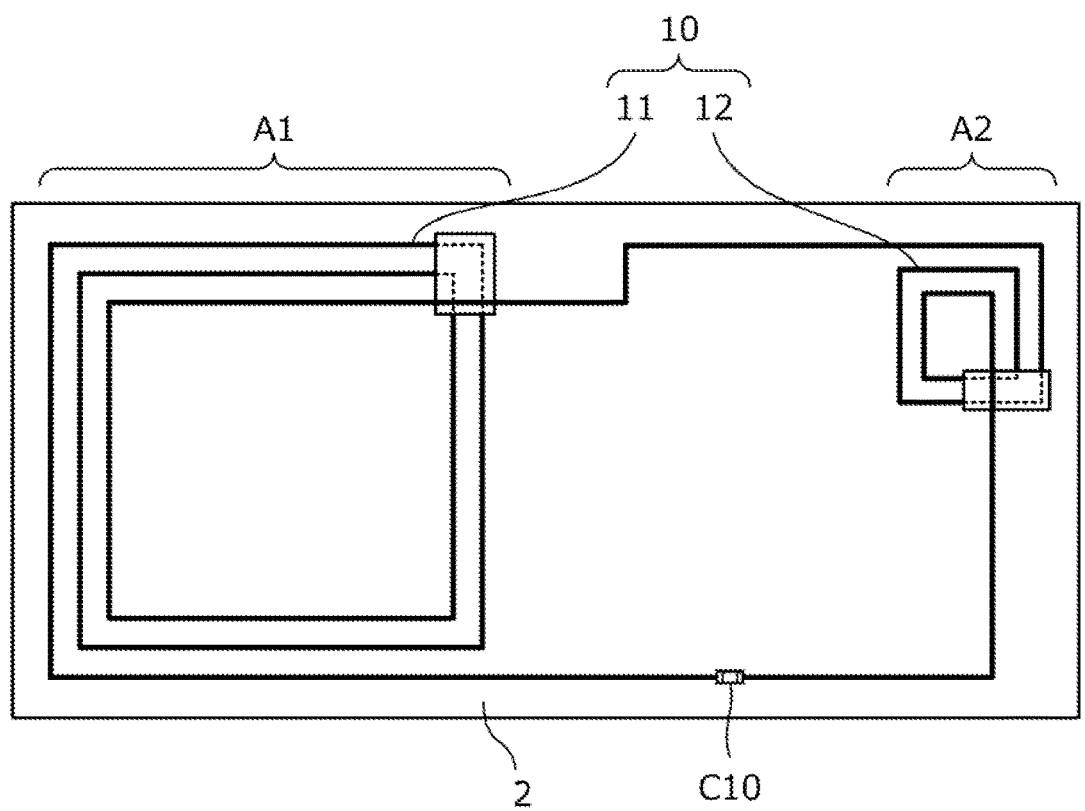
FIG. 6 is a plan view of a configuration of a planar antenna formed on a circuit board according to a second exemplary embodiment.

In the example shown in FIG. 6, the inside diameter of the first coil 11 exceeds one-fourth of the outside diameter of the first coil 11. In this manner, even when the inside diameter of the first coil 11 is largely open, if the coil diameter of the coil antenna (see the coil antenna 40 in FIG. 2) of the portable telephone terminal (the first device) 201 has a size similar to the size of the outside diameter and the inside diameter of the first coil 11, the coil antenna and the first coil will be coupled to each other with a high degree of coupling.

Figure 7:
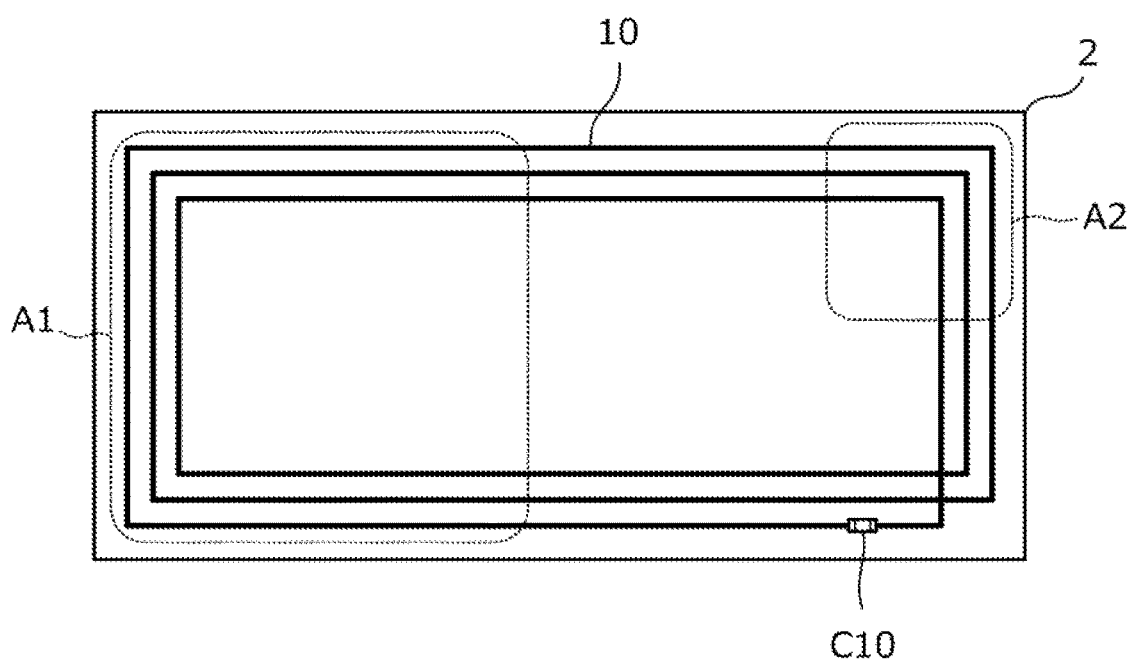
FIG. 7 is a plan view of a configuration of a planar antenna formed on another circuit board according to the second exemplary embodiment.

In the example shown in FIG. 7, a planar antenna 10 extending from the first region A1 over to the second region A2 is provided on the circuit board 2. The coil antenna of a portable telephone terminal is adjacent to the first region A1 and is coupled to the planar antenna 10, and the coil antenna of an RFID tag is adjacent to the second region A2 and is coupled to the planar antenna 10. In this manner, the planar antenna 10 may be an integrated shape in which a portion of the first coil 11 and a portion of the second coil 12 that are mainly shown in FIG. 6 are continuous.

Figure 8:
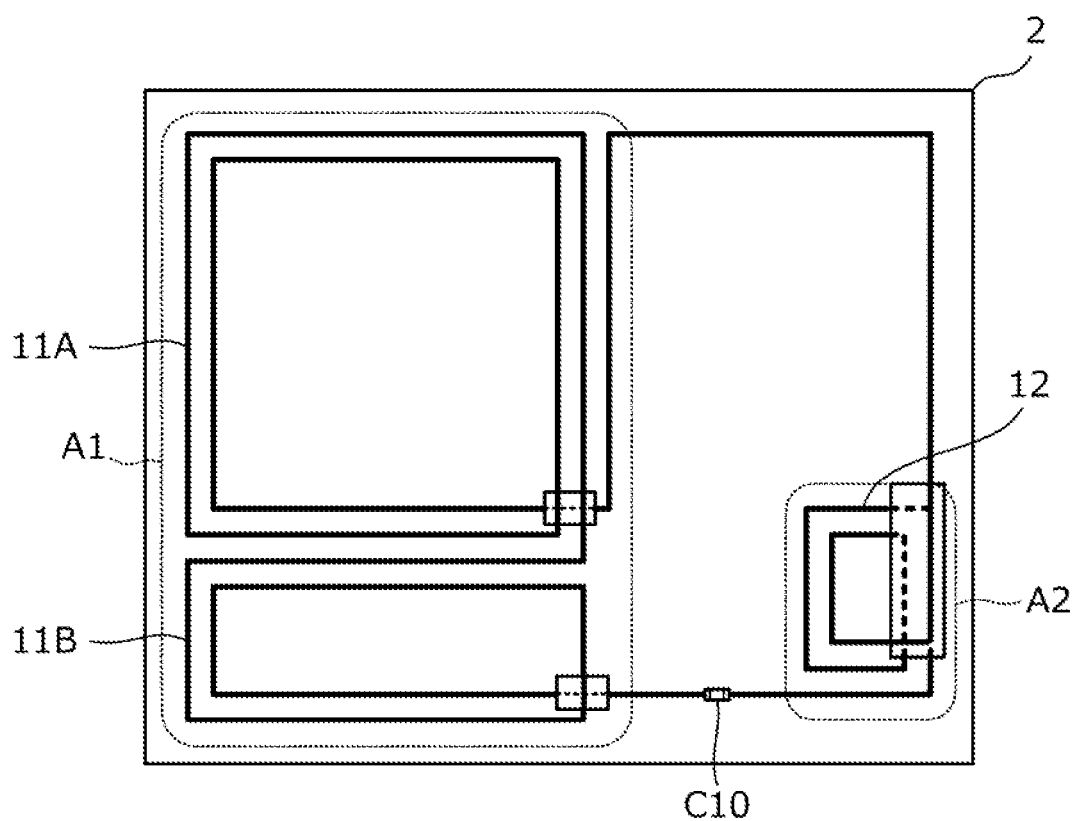
FIG. 8 is a plan view of a configuration of a planar antenna formed on still another circuit board according to a second exemplary embodiment.

In the example shown in FIG. 8, first coils 11A and 11B are formed in positions corresponding to the first region A1, and a second coil 12 is formed in a position corresponding to the second region A2. The winding directions of the first coils 11A and 11B are different from each other and the first coils 11A and 11B form the shape of a figure eight. In addition, the coil diameter of the first coil 11A is different from the coil diameter of the first coil 11B. In this manner, the first coil may be provided with a plurality of coil openings. With this configuration, even when the coil antenna of the portable telephone terminal (first device) is configured by a plurality of coils of which the winding directions are different, the first coil is coupled to the coil antenna.

Third Exemplary Embodiment

Figure 9:
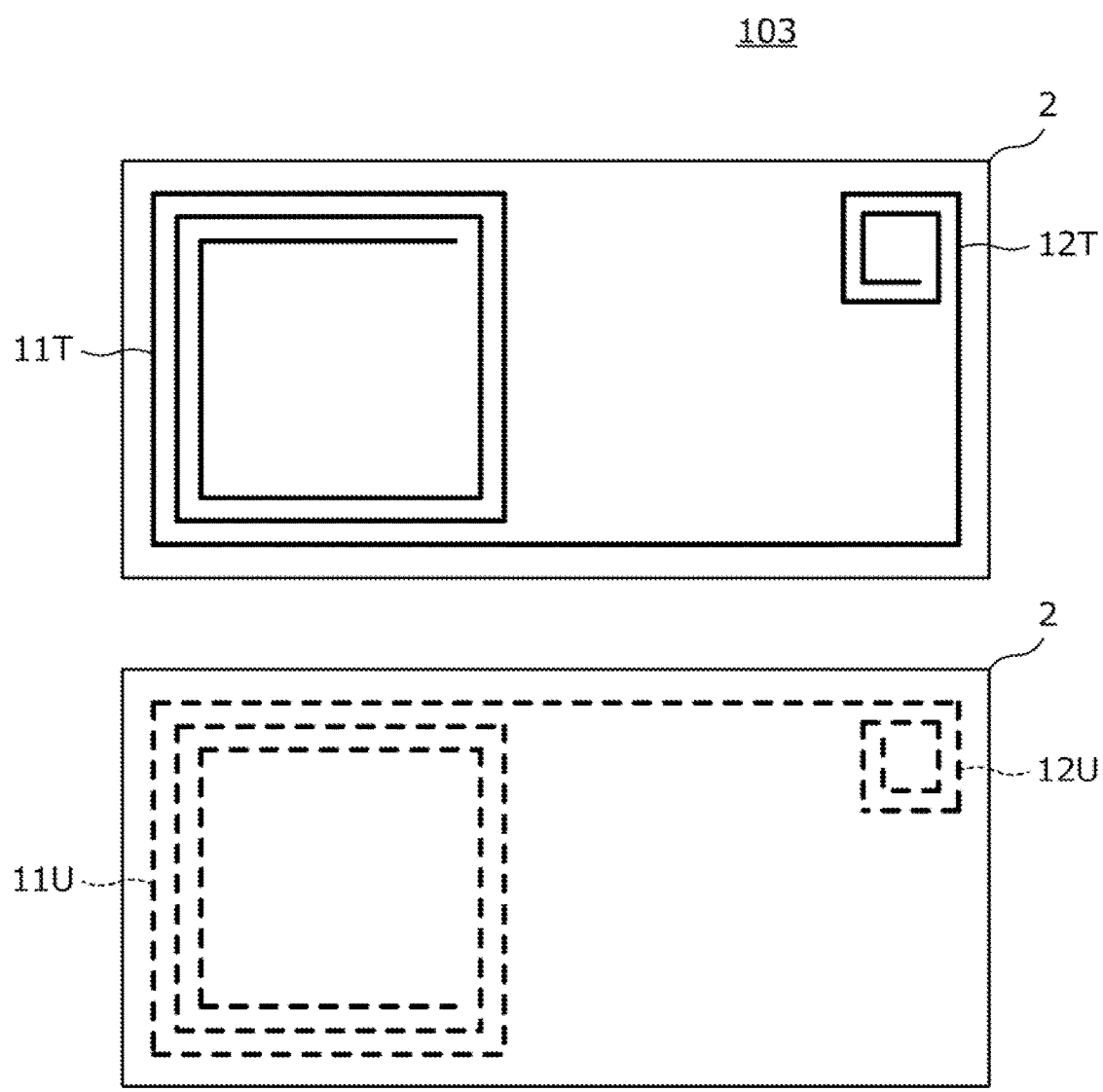
FIG. 9 is an explanatory exploded plan view of a coupling assistance device according to a third exemplary embodiment.
Figure 10:
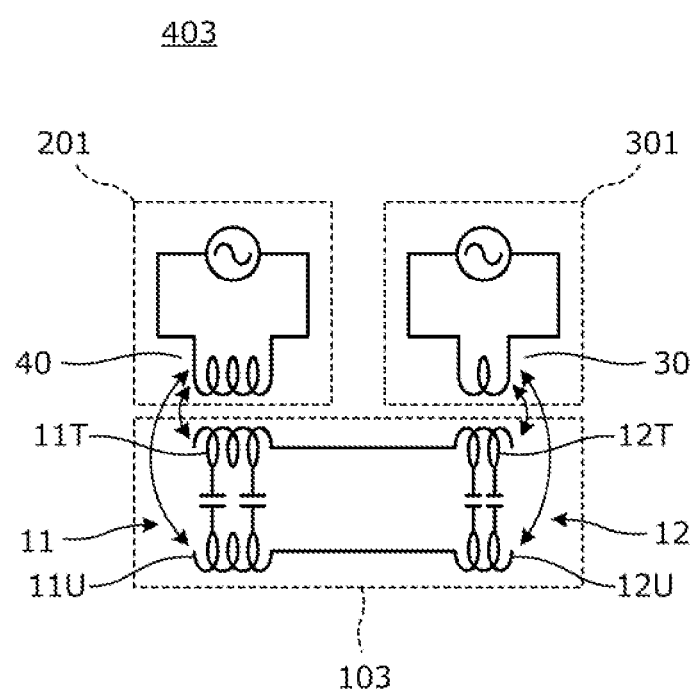
FIG. 10 is a circuit diagram of a main portion of an RFID communication system provided with the coupling assistance device.

In a third exemplary embodiment, a description is made of an example of a coupling assistance device that is not provided with a chip capacitor. FIG. 9 is an explanatory exploded plan view of a coupling assistance device 103 according to the third exemplary embodiment. FIG. 10 is a circuit diagram of a main portion of an RFID communication system 403 provided with this coupling assistance device 103.

FIG. 9 shows a circuit board 2 and a planar antenna formed on this circuit board 2 and omits illustration of a base material that contains the circuit board 2. As shown in FIG. 9, a top side first coil 11T and a top side second coil 12T are formed on the top surface of the circuit board 2. A bottom side first coil 11U and a bottom side second coil 12U are formed on the bottom surface of the circuit board 2. The top side first coil 11T and the bottom side first coil 11U face each other through a base material layer of the circuit board 2, and the top side second coil 12T and the bottom side second coil 12U face each other through the base material layer of the circuit board 2.

As shown in FIG. 10, the top side first coil 11T and the bottom side first coil 11U configure a first coil 11, and the top side second coil 12T and the bottom side second coil 12U configure a second coil 12. In addition, an interlayer capacitance is formed respectively between the top side first coil 11T and the bottom side first coil 11U and between the top side second coil 12T and the bottom side second coil 12U. This interlayer capacitance, the first coil 11, and the second coil 12 configure a resonance circuit. The resonant frequency of this resonance circuit is a communication frequency.

The coil antenna 40 of the portable telephone terminal 201 is magnetically coupled to the first coil 11, and the coil antenna 30 of the RFID tag-containing article 301 is magnetically coupled to the second coil 12. Accordingly, the portable telephone terminal 201 and the RFID tag-containing article 301 are coupled to and communicate with each other through the coupling assistance device 103.

Fourth Exemplary Embodiment

In a fourth exemplary embodiment, a description is made of an example of a coupling assistance device that is not provided with a chip capacitor.

Figure 11:
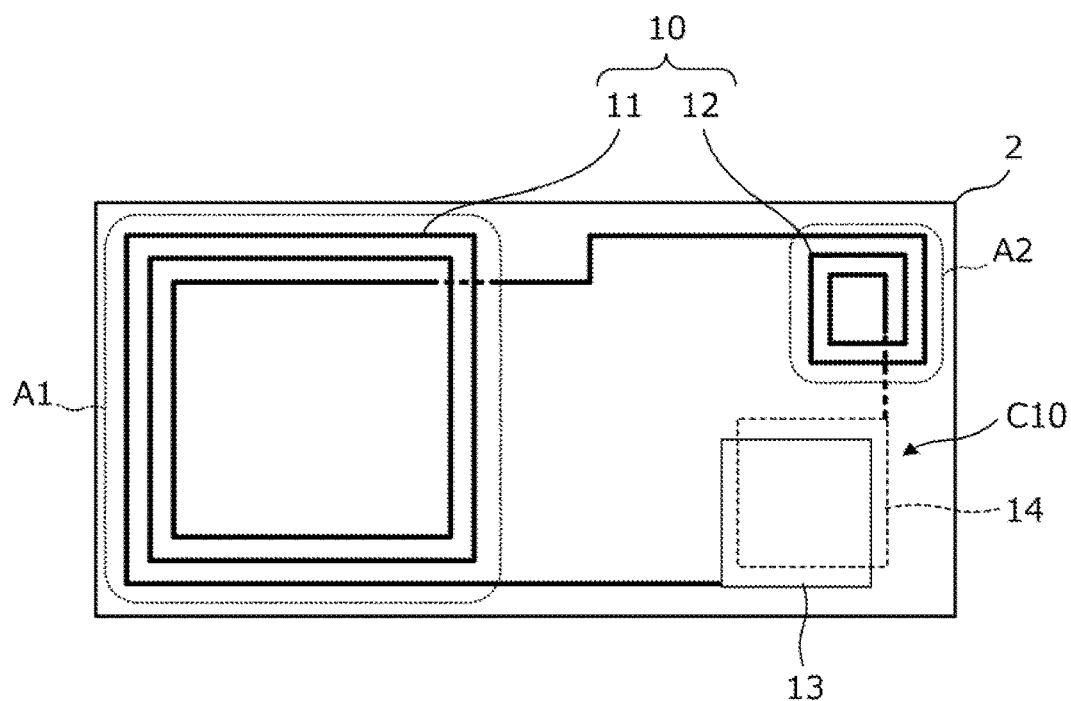
FIG. 11 is a view of a circuit board with which a coupling assistance device according to a fourth exemplary embodiment is provided, and a planar antenna formed on this circuit board.

FIG. 11 is a view of a circuit board 2 configuring a main portion of a coupling assistance device according to the fourth exemplary embodiment, and a planar antenna formed on this circuit board 2. A planar antenna 10 configured by the first coil 11 and the second coil 12 is provided on the top surface of the circuit board 2. In addition, an electrode 13 for a capacitor is provided on the top surface of the circuit board 2 and an electrode 14 for a capacitor is provided on the bottom surface of the circuit board 2. The electrodes 13 and 14 for a capacitor face each other through the base material layer of the circuit board 2, which configures a capacitor C10 for resonance. In this manner, a lumped constant type capacitor C10 may be formed on the circuit board 2.

Fifth Exemplary Embodiment

In a fifth exemplary embodiment, a description is made of a coupling assistance device having a feature of a shape between a first coil and a second coil.

Figure 12A:
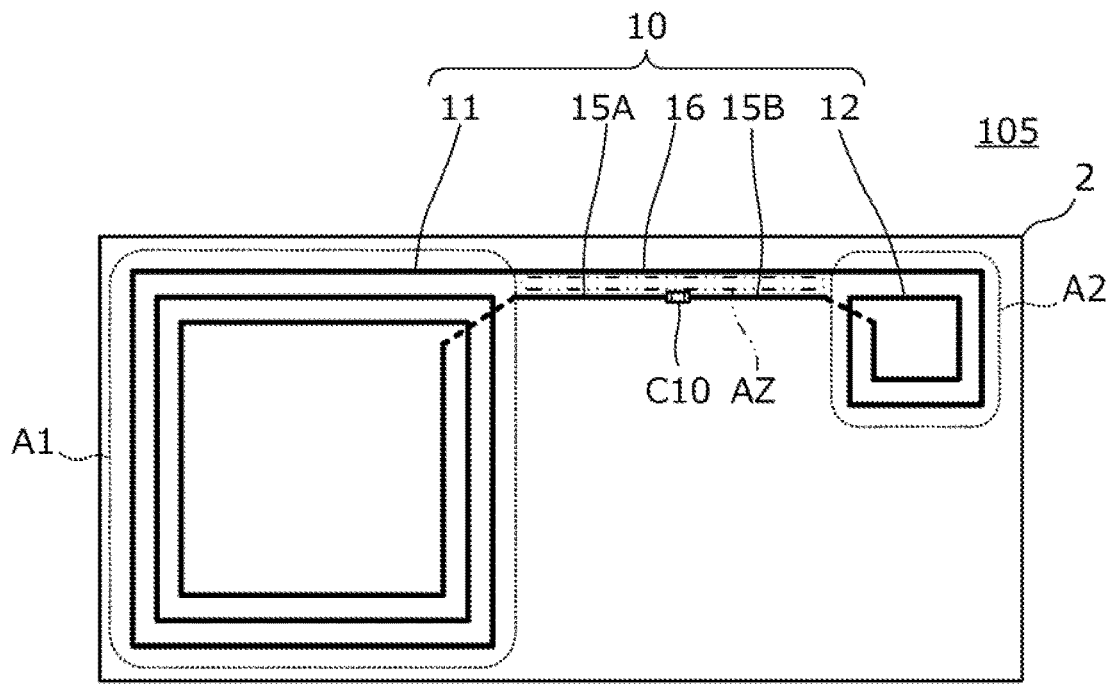
FIG. 12A is a plan view of a circuit board with which a coupling assistance device according to a fifth exemplary embodiment is provided.
Figure 12B:
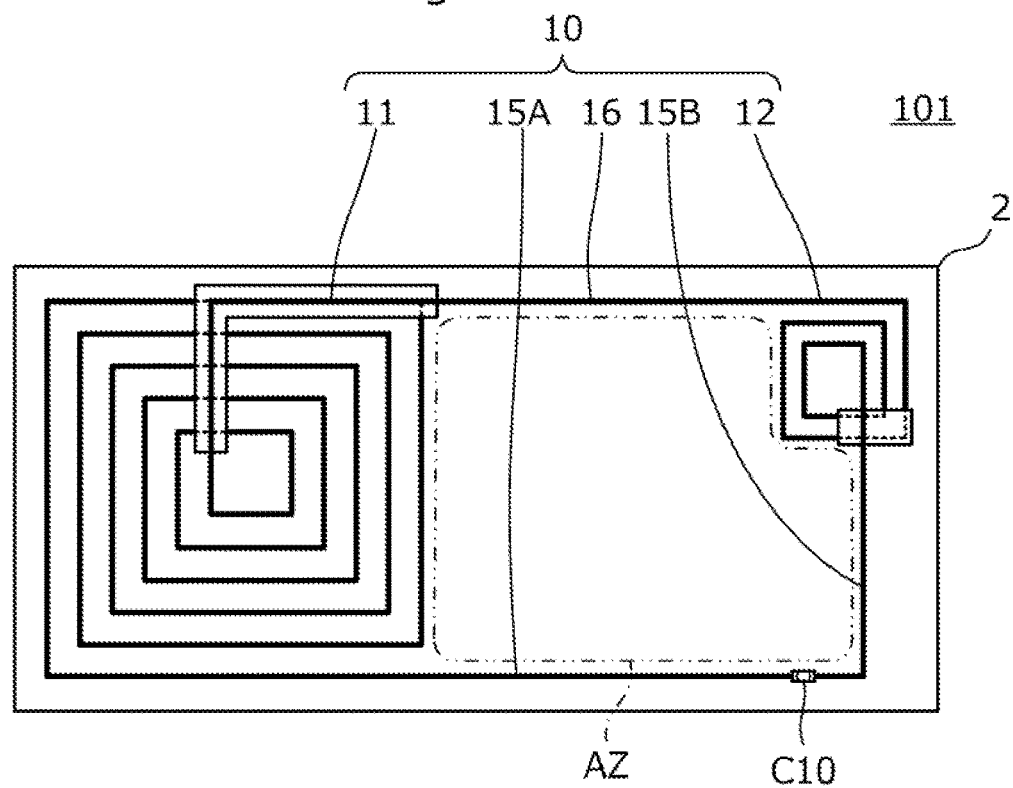
FIG. 12B is a plan view of a circuit board with which the coupling assistance device of a comparative example is provided.

FIG. 12A is a plan view of a circuit board 2 with which a coupling assistance device 105 according to the fifth exemplary embodiment is provided, and FIG. 12B is a plan view of a circuit board 2 with which the coupling assistance device 101 of a comparative example is provided.

As shown in FIG. 12A, the coupling assistance device 105 is provided with a circuit board 2 on which a planar antenna 10 is formed. In the fifth exemplary embodiment, the circuit board 2 includes a first coil 11 and a second coil 12. The first coil 11 may be a spiral-shaped coil corresponding to the first region A1, and the second coil 12 may be a spiral-shaped coil corresponding to the second region A2. The first coil 11 and the second coil 12 are connected in series through a capacitor C10 for resonance. In this example, the capacitor C10 for resonance is a chip capacitor mounted on the circuit board 2.

The coupling assistance device 101 of the comparative example shown in FIG. 12B is the same coupling assistance device 101 as the coupling assistance device shown in FIG. 3A in the first exemplary embodiment.

The planar antenna 10 of each of the coupling assistance device 105 and the coupling assistance device 101 of the comparative example is configured by the first coil 11, the second coil 12, and the connecting portions 15A, 15B, and 16 connecting the first coil 11 and the second coil 12.

The connecting portion 15A of the coupling assistance device 105 includes a conductor pattern provided on the back surface of the circuit board 2, and the connecting portion 15A is connected to the first coil 11 through the conductor pattern on this back surface. Similarly, the connecting portion 15B of the coupling assistance device 105 includes a conductor pattern provided on the back surface of the circuit board 2, and the connecting portion 15B is connected to the second coil 12 through the conductor pattern on this back surface.

It is noted that, although, also in any of the above described exemplary embodiments, the planar antenna 10 provided with the first coil 11 and the second coil 12 is provided with the connecting portion connecting the first coil 11 and the second coil 12, the reference numeral of the connecting portion is not indicated.

In the coupling assistance device 105 of the fifth exemplary embodiment, an area of a region AZ defined by the connecting portions 15A, 15B, and 16 is smaller than an area of a region in which the first coil 11 is provided and an area of a region in which the second coil 12 is provided. In addition, the area of the region AZ of the coupling assistance device 105 of the fifth exemplary embodiment is smaller than the area of the region AZ of the coupling assistance device 101 of the comparative example.

The region defined by the connecting portions 15A, 15B, and 16 may contribute or may not contribute to magnetic field coupling with an antenna of a communication partner. In addition, when another unnecessary magnetic flux is interlinked with the region defined by the connecting portions 15A, 15B, and 16, the connecting portions 15A, 15B, and 16 may be affected by the unnecessary magnetic flux. Furthermore, when an conductor is brought close to the region defined by the connecting portions 15A, 15B, and 16, unnecessary coupling between the conductor brought close to the region and the connecting portions 15A, 15B, and 16 may occur.

According to the fifth exemplary embodiment, since the area of the region AZ defined by the connecting portions is small, it is unlikely to be adversely affected by the unnecessary magnetic flux or the conductor.

It is noted that all of the connecting portions 15A and 15B shown in FIG. 12A may be formed on the back surface of the circuit board 2, and the connecting portions may be arranged so that the connecting portions 15A and 15B and the connecting portion 16 may overlap in a plan view. As a result, the region AZ defined by the connecting portions is able to be minimized.

In the example shown in FIG. 12A, while the winding directions of the first coil 11 and the second coil 12 are directions such that polarities of an induction current have the same phase when magnetic fluxes penetrating the first coil 11 and the second coil 12 extend in the same direction, the winding directions of the first coil 11 and the second coil 12 may be directions such that polarities of an induction current have the same phase when magnetic fluxes penetrating the first coil 11 and the second coil 12 extend in opposite directions.

Sixth Exemplary Embodiment

In a sixth exemplary embodiment, a description will be made of a coupling assistance device with a planar conductor.

Figure 13A:
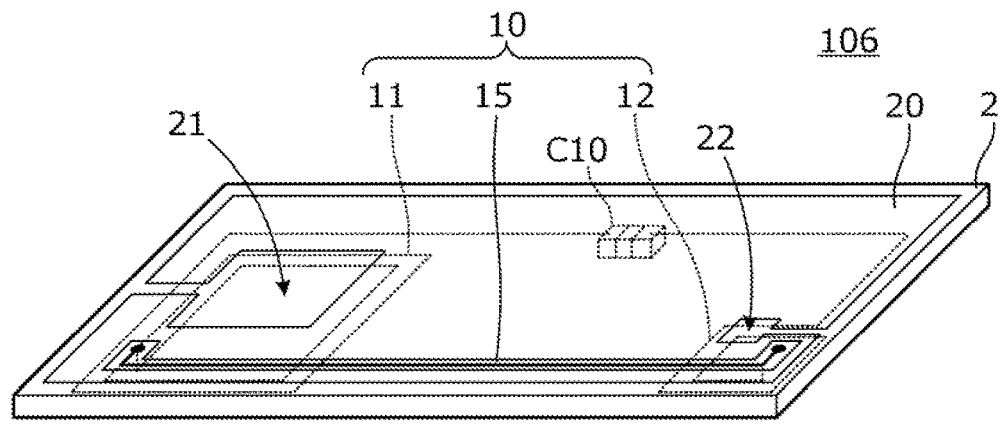
FIG. 13A is a perspective view of a coupling assistance device according to a sixth exemplary embodiment.
Figure 13B:
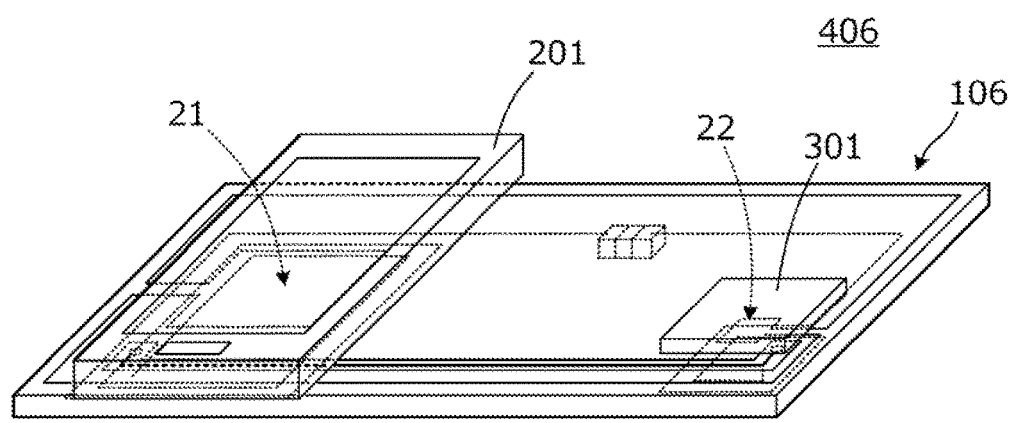
FIG. 13B is a perspective view of an RFID communication system provided with the coupling assistance device.
Figure 14:
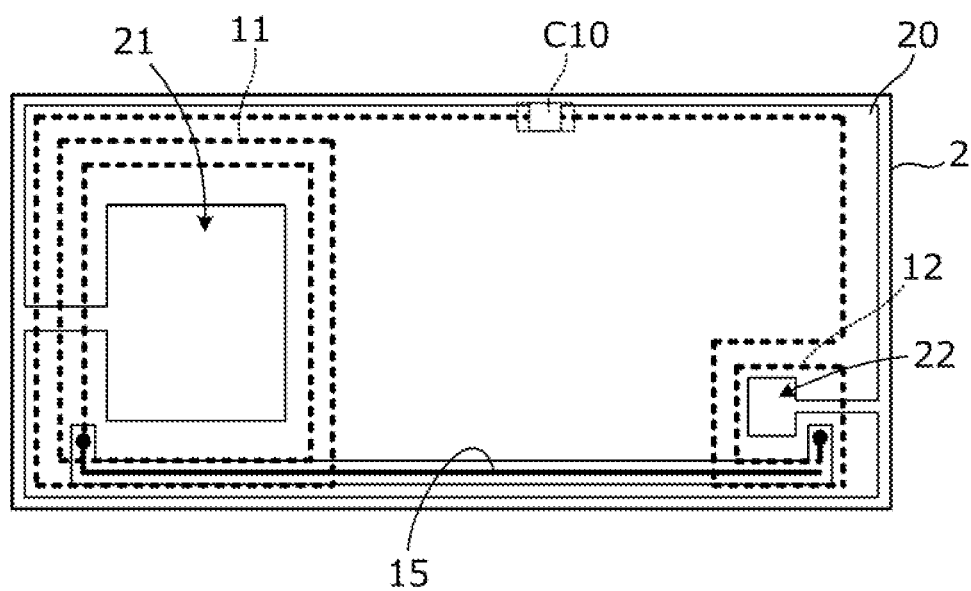
FIG. 14 is a plan view of the circuit board of the coupling assistance device according to the sixth exemplary embodiment.
Figure 15:
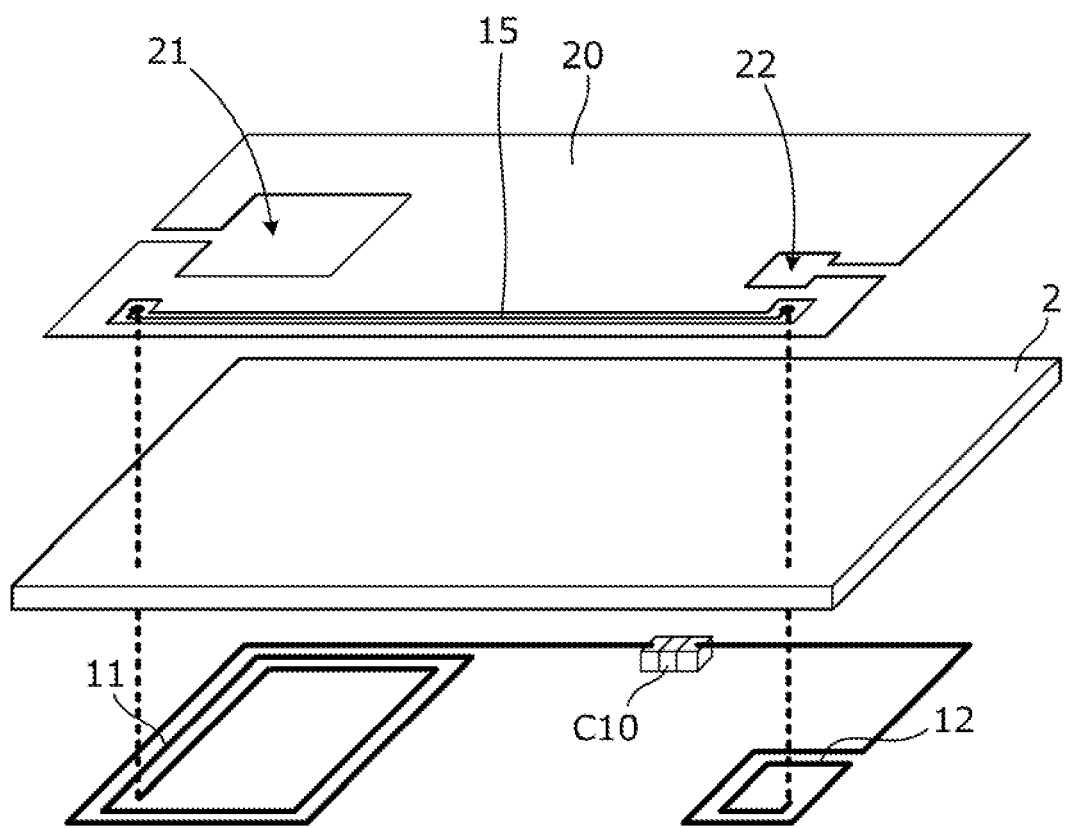
FIG. 15 is an explanatory exploded perspective view of various kinds of conductor patterns formed on a top surface and a bottom surface of the circuit board of the coupling assistance device according to the sixth exemplary embodiment.

FIG. 13A is a perspective view of a coupling assistance device 106 according to the sixth exemplary embodiment, and FIG. 13B is a perspective view of an RFID communication system 406 provided with the coupling assistance device 106. In the figures, however, a circuit board contained in a base material is shown. FIG. 14 is a plan view of the circuit board 2. In addition, FIG. 15 is an explanatory exploded perspective view of various kinds of conductor patterns formed on the top surface and the bottom surface of the circuit board.

The coupling assistance device 106, as shown in FIG. 13A, is provided with a circuit board 2 on which a planar antenna 10 is formed. This circuit board 2, as mainly shown in FIG. 2 of the first exemplary embodiment, is contained in the base material.

In the sixth exemplary embodiment, a first coil 11 and a second coil 12 are formed on the bottom surface of the circuit board 2, and a wiring conductor 15 is formed on the top surface. Each of the first coil 11 and the second coil 12 may be a spiral-shaped coil. The first coil 11 and the second coil 12 are connected in series through a capacitor C10 for resonance and the wiring conductor 15. In this example, the capacitor C10 for resonance is a chip capacitor mounted on the circuit board 2.

On the top surface of the circuit board 2, a planar conductor 20 that covers a region between a region in which the first coil 11 is formed and a region in which the second coil 12 is formed is provided. In addition, the planar conductor 20 includes a removed portion 21 at a position that faces the coil opening of the first coil 11 and a removed portion 22 at a position that faces the coil opening of the second coil 12.

Figure 16A:
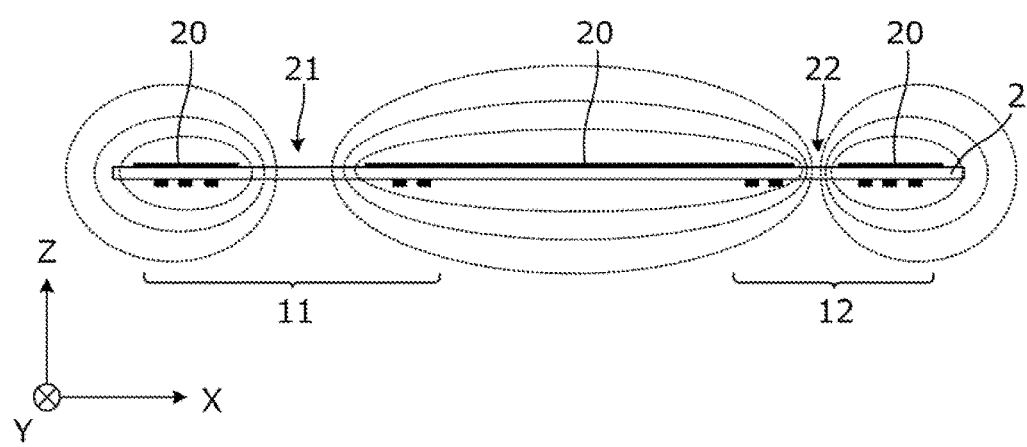
FIG. 16A is a view of an example of magnetic flux to be generated in the coupling assistance device according to the sixth exemplary embodiment.
Figure 16B:
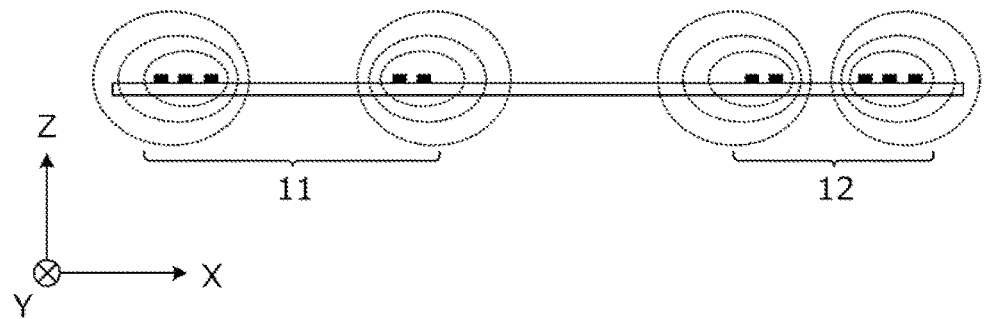
FIG. 16B is a view of an example of magnetic flux to be generated in a coupling assistance device of a comparative example.

FIG. 16A and FIG. 16B are cross-sectional views showing operational effects obtained by presence of the planar conductor 20. In both figures, schematic distribution of magnetic flux is indicated by broken lines. FIG. 16A is a view of an example of magnetic flux to be generated in the coupling assistance device 106 according to the sixth exemplary embodiment, and FIG. 16B is a view of an example of magnetic flux to be generated in a coupling assistance device of a comparative example. The coupling assistance device of a comparative example does not include the planar conductor 20 of the coupling assistance device 106.

In the comparative example shown in FIG. 16B, the magnetic flux penetrating the coil opening of the first coil 11 only goes around the vicinity of the first coil 11, and the magnetic flux penetrating the coil opening of the second coil 12 only goes around the vicinity of the second coil 12.

In the coupling assistance device 106 of the sixth exemplary embodiment, as shown in FIG. 16A, the magnetic flux penetrating the coil opening of the first coil 11 converges on the removed portion 21, and the magnetic flux penetrating the coil opening of the second coil 12 converges on the removed portion 22. Thus, the magnetic flux converges on the region in which the first coil 11 is formed and the region in which the second coil 12 is formed, so that the coupling between the first coil of the coupling assistance device and the first antenna of the first device, and the coupling between the second coil and the second antenna of the second device are respectively strengthened. Thus, the maximum separable distance between the first device and the coupling assistance device and the maximum separable distance between the second device and the coupling assistance device are able to be increased.

In addition, in the coupling assistance device 106 of the sixth exemplary embodiment, since the planar conductor 20 covers the region between the region in which the first coil 11 is formed and the region in which the second coil 12 is formed, the magnetic flux is likely to be generated, the magnetic flux penetrating and largely going around the coil opening of the first coil 11 and the coil opening of the second coil 12. Thus, a region of which the magnetic flux density is high also expands in the X-Y plane direction in FIG. 16A. Thus, in the X-Y plane direction, tolerance for misalignment of the first device with respect to the region in which the first coil of the coupling assistance device is formed and tolerance for misalignment of the second device with respect to the region in which the second coil of the coupling assistance device is formed are increased.

Moreover, in a case in which a large positional misalignment of the first antenna of the first device occurs with respect to the region in which the first coil 11 is formed, in the X-Y plane direction, at a time when the positional misalignment reaches a certain point, the degree of coupling between the first coil 11 and the first antenna becomes zero (a null point occurs). This also applies to the relationship between the second coil 12 and the second antenna of the second device. In contrast, according to the sixth exemplary embodiment, since the coil opening of the first coil 11 is magnetically exposed at the removed portion 21 of the planar conductor, and the circumference of the coil opening is covered by the planar conductor 20, a null point is difficult to occur with respect to the positional misalignment in the plane direction of the first device to the region in which the first coil 11 is formed. Similarly, a null point is also difficult to occur with respect to the positional misalignment in the plane direction of the second device to the region in which the second coil 12 is formed.

In addition, in a case in which the planar antenna 10 configures at least a portion of a resonance circuit, although the resonant frequency of the resonance circuit varies according to the positional relationship (proximity condition) of the first antenna of the first device and the second antenna of the second device with respect to the planar antenna 10, by the planar conductor 20 present between the planar antenna 10 and the first antenna of the first device and between the planar antenna 10 and the second antenna of the second device, as in the sixth exemplary embodiment, the variance of the resonant frequency is significantly reduced or prevented.

Seventh Exemplary Embodiment

In a seventh exemplary embodiment, a description will be made of an example in which a flip cover type case of a portable telephone terminal is configured as an antenna device for relay.

Figure 17:
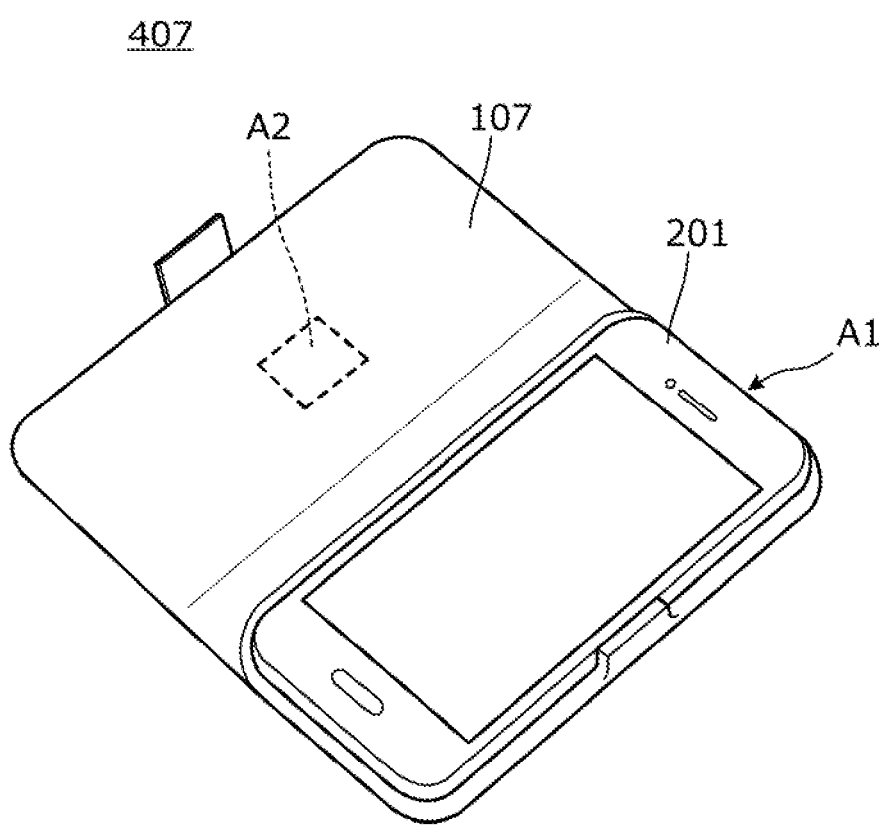
FIG. 17 is a perspective view of an RFID communication system according to a seventh exemplary embodiment.

FIG. 17 is a perspective view of an RFID communication system 407 according to the seventh exemplary embodiment. This RFID communication system 407 is configured by a portable telephone terminal 201, a coupling assistance device 107, and an RFID tag-containing article (not shown) that is placed in the second region A2 of this coupling assistance device 107. The coupling assistance device 107 is a flip cover type case of the portable telephone terminal 201.

In the first region A1 of the coupling assistance device 107, an attaching portion to which the portable telephone terminal 201 is to be attached is provided. The portable telephone terminal 201 is attached to this attaching portion.

The coupling assistance device 107 has flexibility between the first region A1 and the second region A2 of the base material, and is able to cover the portable telephone terminal 201 in a flip cover manner. Although not shown in FIG. 17, a positioning mark that shows a position at which the RFID tag-containing article is to be placed may previously be provided in the coupling assistance device 107. The configuration of the inside of the coupling assistance device 107 is the same as the configuration shown in the above exemplary embodiments.

According to the seventh exemplary embodiment, the coupling assistance device 107 is opened and is set into a state that is shown in FIG. 17, and an article containing an RFID tag, for example, is placed on the positioning mark of the second region A2, which enables the portable telephone terminal 201 to communicate with an RFID tag-containing article. In other words, since the coupling assistance device 107 is a flip cover type case, the positioning of the portable telephone terminal 201 with respect to the coupling assistance device 107 is determined in the first place, and, only by arranging (placing) an RFID tag-containing article, the portable telephone terminal 201 is able to easily communicate with the RFID tag-containing article.

In addition, according to the seventh exemplary embodiment, in a state where the coupling assistance device 107 is not used for relay, the base material is able to be bent between the first region A1 and the second region A2 and is thus able to be reduced in size.

It is noted that a fixing portion that fixes an RFID tag-containing article (see the RFID tag-containing article 301 in FIG. 1, for example) may be provided in the second region A2 of the coupling assistance device 107. With such a configuration, the positioning of the RFID tag-containing article 301 with respect to the coupling assistance device 107 becomes easy.

Eighth Exemplary Embodiment

In an eighth exemplary embodiment, a description will be made of an example of a coupling assistance device provided with a circuit board having flexibility such that an angle between the surface of a first region and the surface of a second region is able to be adjusted and a base material 1 having a hinge portion capable of folding the first region and the second region, and an RFID communication system using such a coupling assistance device.

Figure 18:
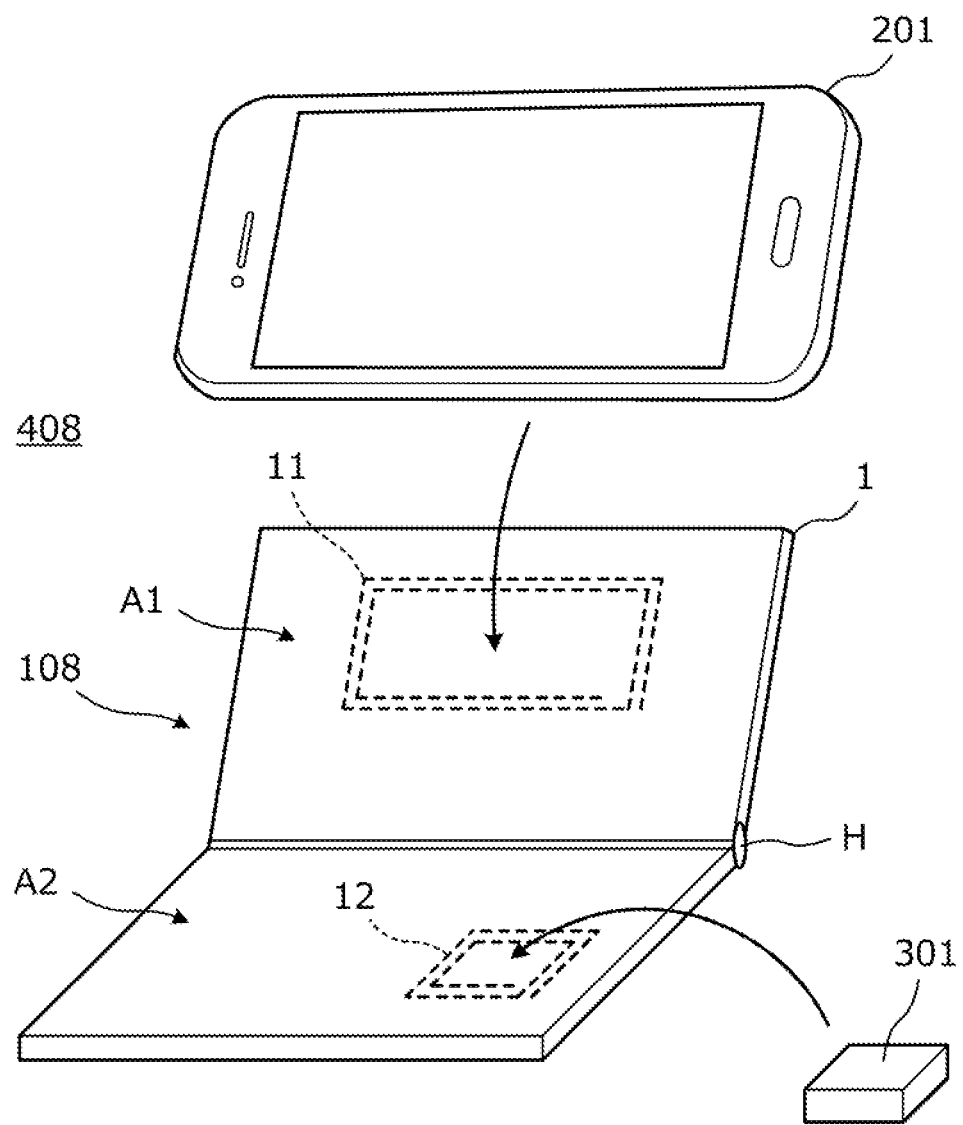
FIG. 18 is a perspective view of an RFID communication system according to an eighth exemplary embodiment.

FIG. 18 is a perspective view of an RFID communication system 408 according to an eighth exemplary embodiment. This RFID communication system 408 is configured by a coupling assistance device 108, a portable telephone terminal 201, and an RFID tag-containing article 301. The base material 1 of the coupling assistance device 108 also serves as the stand of the portable telephone terminal 201. The base material 1 includes a first region A1 against which the portable telephone terminal 201 is leaned, and a second region A2 in which the RFID tag-containing article 301 is placed. A hinge portion H may be provided between the first region A1 and the second region A2 of the base material 1.

Figure 19:
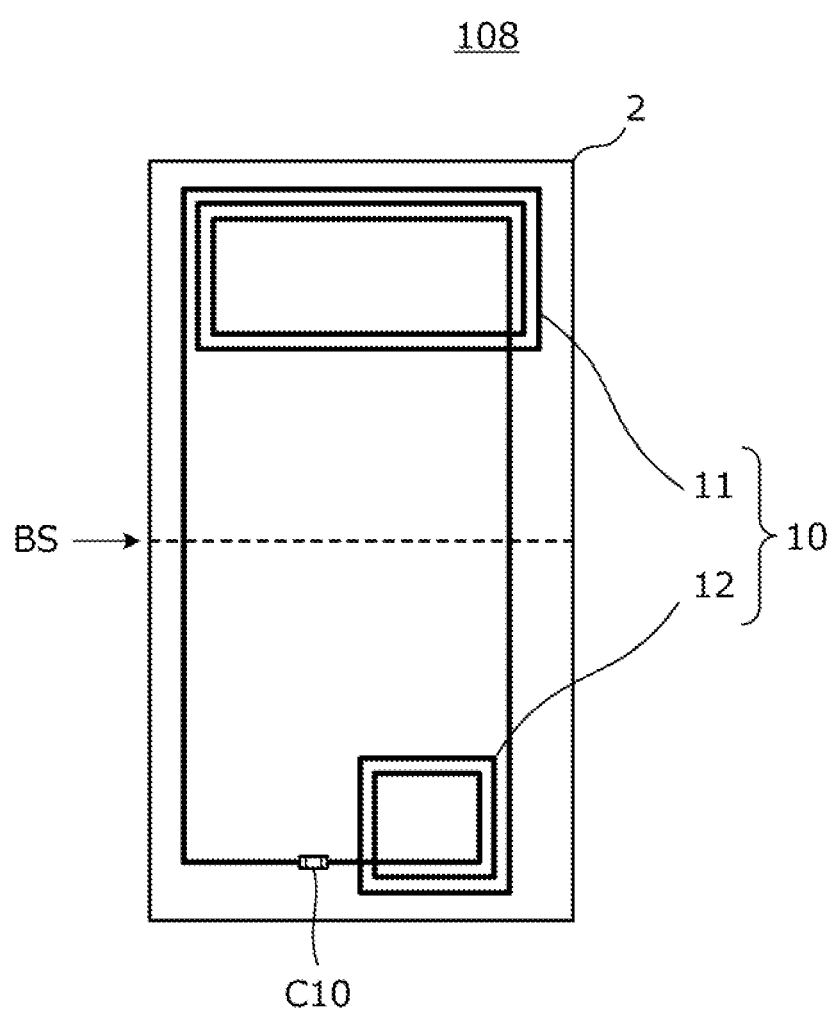
FIG. 19 is a plan view of a circuit board contained in the base material of a coupling assistance device of the RFID communication system according to the eighth exemplary embodiment.

FIG. 19 is a plan view of a circuit board 2 contained in the base material 1. The circuit board 2 includes a first coil 11 and a second coil 12. The first coil 11 may be a spiral-shaped coil corresponding to the first region A1, and the second coil 12 may be a spiral-shaped coil corresponding to the second region A2. The first coil 11 and the second coil 12 are connected in series through a capacitor C10 for resonance.

The first coil 11 may be a rectangular spiral-shaped coil that is flattened in the width direction of the circuit board 2. The second coil 12 may be a rectangular spiral-shaped coil that is smaller than the first coil. The circuit board 2 has flexibility, and may include a bending portion BS. When the base material 1 is opened and closed by the hinge portion H shown in FIG. 18, the circuit board 2 is bent at the bending portion BS.

As shown in FIG. 18, the portable telephone terminal 201 is leaned against the first region A1 of the base material 1, and the RFID tag-containing article 301 is placed in the second region A2, so that the portable telephone terminal 201 and the RFID tag-containing article 301 may be coupled and communicate with each other through the coupling assistance device 108. In other words, the portable telephone terminal 201 reads and writes data to the RFID tag-containing article 301.

According to the eighth exemplary embodiment, since the portable telephone terminal 201 is able to be used while being leaned against an inclined portion of the base material 1 being a stand, and the RFID tag-containing article is easily placed on a flat portion of the base material 1, convenience is improved.

Ninth Exemplary Embodiment

In a ninth exemplary embodiment, a description is made of a coupling assistance device and an RFID communication system that have a feature of the relationship of shapes of the coil antenna 40 being the first antenna and the first coil 11.

Figure 20:
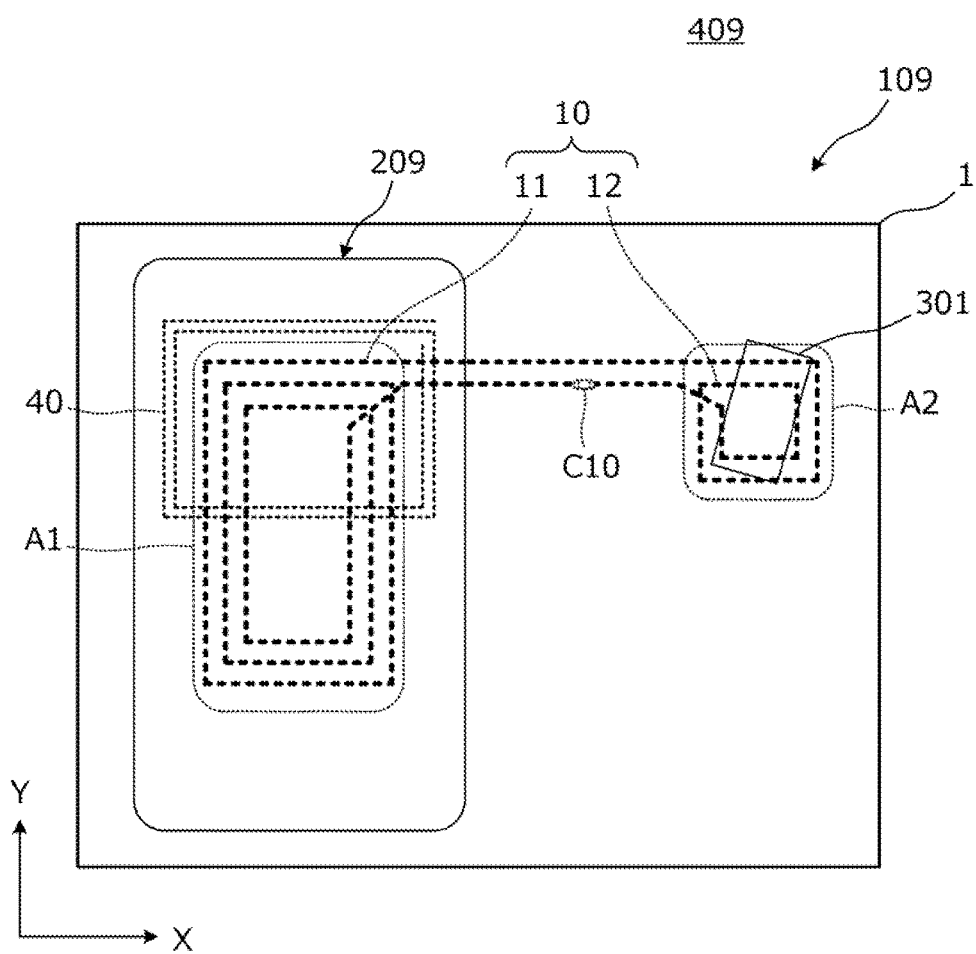
FIG. 20 is a view of a configuration of an RFID communication system configured by a coupling assistance device, a portable telephone terminal, and an RFID tag-containing article, according to a ninth exemplary embodiment.
Figure 21:
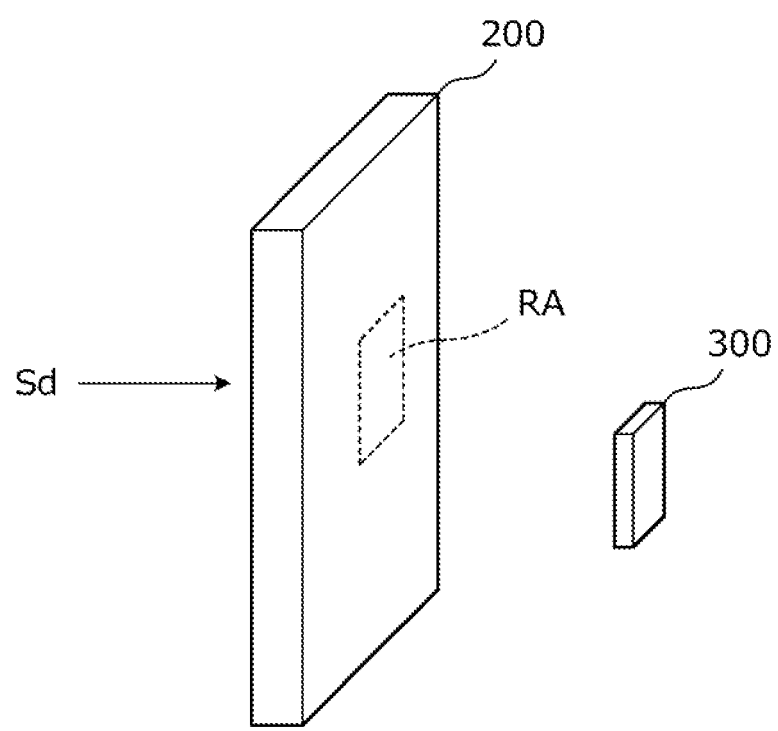
FIG. 21 is a view of a state at a time of a reading operation in a conventional RFID communication system.

FIG. 20 is a view of a configuration of an RFID communication system 409 configured by a coupling assistance device 109, a portable telephone terminal 209, and an RFID tag-containing article 301, according to the ninth exemplary embodiment.

The coupling assistance device 109 is provided with a planar antenna 10 including a first coil 11 and a second coil 12. The first coil 11 corresponds to a first region A1 of the planar antenna 10, and the second coil 12 corresponds to a second region A2 of the planar antenna 10. The first coil 11 may have a rectangular spiral shape.

A portable telephone terminal 209 being a first device is to be placed in the first region A1, and an RFID tag-containing article 301 being a second device is to be placed in the second region A2. The portable telephone terminal 209 is provided with a rectangular spiral-shaped coil antenna 40 being the first antenna.

The aspect ratio of the first coil 11 may be different from the aspect ratio of the coil antenna 40. In this example, an approximate shape of the first coil 11 is long in the Y axis direction, and an approximate shape of the coil antenna 40 is long in the X axis direction.

According to the ninth exemplary embodiment, since the approximate shape of the first coil 11 and the approximate shape of the coil antenna 40 are different from each other, the degree of coupling between the first coil 11 and the coil antenna 40 does not become too high. Thus, the resonant frequency of a resonance circuit including the planar antenna 10 is not greatly changed before and after the placement of the portable telephone terminal 209. In addition, as a result, when the shape of a coil antenna provided in the first device to be placed in the first region A1 varies differently, the degree of coupling between the first coil 11 and the coil antenna 40 is not greatly changed according to the first device to be placed. Accordingly, the resonant frequency of the resonance circuit including the planar antenna 10 is stabilized, and a coupling assistance device of which the characteristics are stabilized is obtained.

It is noted that, while the above exemplary embodiments have described an example in which any of the first coil 11, the second coil 12, and the coil antennas 30 and 40 has a spiral shape, the shape is not limited to a spiral shape. For example, the coils may be rectangular helical-shaped coils that are formed over two or more layers.

Finally, the foregoing exemplary embodiments are illustrative in all points and should not be construed to limit the present invention. It is to be understood that variations and modifications will be apparent to those skilled in the art without departing from the scope and spirit of the present invention. For example, configurations illustrated in different exemplary embodiments are able to be partially replaced and combined with each other. The scope of the present invention is defined not by the foregoing exemplary embodiment but by the following claims. Further, the scope of the present invention is intended to include all modifications within the scopes of the claims and within the meanings and scopes of equivalents.

For example, while the above exemplary embodiments have described the portable telephone terminals 201 such as a so-called smartphone as an example of the first device and the RFID tag-containing article 301 as an example of the second device, both of the first and second devices may be portable telephone terminals. In addition, even when the first and second devices are a tablet terminal, a game machine, a toy, an electronic dictionary, a camera, a notebook PC, or a wearable terminal (such as a so-called smartwatch and smart glasses), the application is possible.

Moreover, the frequency used for communication for the coupling assistance device and the RFID communication system of the present invention is not limited to the HF band. For example, the present invention is also applicable to the RFID system of the UHF band.

REFERENCE SIGNS LIST

A1—First region
A2—Second region
AZ—connecting portion-defining region
C10, C30, C40—Capacitor for resonance
S1—First principal surface
Sd—Display surface
1—Base material
2—Circuit board
3—Magnetic layer
10—Planar antenna
11, 11A, 11B—First coil
11T—Top side first coil
11U—Bottom side first coil
12—Second coil
12T—Top side second coil
12U—Bottom side second coil
13, 14—Electrode for a capacitor
15A, 15B, 16—Wiring conductor
20—Planar conductor
21, 22—Removed portion
30—Coil antenna
31—Magnetic layer
32—Coil conductor
33—Nonmagnetic layer
34, 35—Input and output terminal
40—Coil antenna
51, 52—RFIC
101, 105, 106, 107, 108—Coupling assistance device 200, 201, 209—Portable telephone terminal (first device)
300, 301—RFID tag-containing article (second device)
401, 403, 407, 408, 409—RFID communication system

What is claimed is:

1. A coupling assistance device comprising:
   a base that includes a first principal surface; and
   a planar antenna disposed at the base,
   wherein the first principal surface of the base includes:
      a first region configured to have a first device with a first antenna placed thereon; and
      a second region configured to have a second device with a second antenna placed thereon;
   wherein the first region and the second region are positioned at a distance relative to each other such that, when the first antenna is placed adjacent to the first region and the second antenna is placed adjacent to the second region, the first device and the second device are both simultaneously positioned on the first principal surface of the base, and
   wherein the planar antenna extends from the first region of the base to the second region of the base, and is communicatively coupled to the first antenna in the first region and the second antenna in the second region when the first and second devices are placed on the first and second regions, respectively.

2. The coupling assistance device according to claim 1, wherein the planar antenna configures at least a portion of a resonance circuit that resonates in a frequency band in which the first device and the second device communicate.

3. The coupling assistance device according to claim 1, further comprising a magnetic layer disposed at a surface of the planar antenna on an opposite side of a surface of the planar antenna to which the first device and the second device are to be adjacent.

4. The coupling assistance device according to claim 1, wherein:
   a portion of the planar antenna corresponding to the first region includes a first coil with a winding axis that extends in a normal direction of the first principal surface of the base,
   a portion of the planar antenna corresponding to the second region includes a second coil with a winding axis that extends in the normal direction of the first principal surface of the base, and
   the planar antenna includes the first coil, the second coil, and a connecting portion connecting the first coil to the second coil.

5. The coupling assistance device according to claim 4, wherein each of the first coil and the second coil is a spiral-shaped coil.

6. The coupling assistance device according to claim 4, wherein an inside diameter of the first coil is less than or equal to one-fourth of an outside diameter of the first coil.

7. The coupling assistance device according to claim 6, wherein the first coil includes a conductor pattern having a line space that is larger than a line width of the conductor pattern.

8. The coupling assistance device according to claim 4, wherein the first and second coils having winding directions such that polarities of an induction current have a same phase when magnetic fluxes penetrating the first and second coils extend in a same direction.

9. The coupling assistance device according to claim 4, wherein an area of a region defined by the connecting portion is smaller than an area of a region in which the first coil is disposed and an area of a region in which the second coil is disposed.

10. The coupling assistance device according to claim 4, further comprising a planar conductor that covers a region between the first coil and the second coil and includes removed portions at positions facing coil openings of the first and second coils, wherein the first and second coils have winding directions such that polarities of an induction current have a same phase when magnetic fluxes penetrating the first and second coils extend in opposite directions.

11. The coupling assistance device according to claim 4, wherein the first coil is larger than the second coil.

12. The coupling assistance device according to claim 1, wherein the base further comprises:
   a first fixing portion configured to fix the first device at a position at which the first antenna is adjacent to the first region; and
   a second fixing portion configured to fix the second device at a position at which the second antenna is adjacent to the second region.

13. The coupling assistance device according to claim 1, wherein the base includes a flexible member or a hinge member between the first and second regions, wherein the flexible member is configured to adjust an angle between a surface of the first region and a surface of the second region, and wherein the hinge member is configured to fold the first region and the second region.

14. The coupling assistance device according to claim 13, wherein the base configures a flip cover type case that includes an attaching portion configured to attach to the first device and a placing portion configured to have the second device placed thereon.

15. An RFID communication system comprising:
   a first device that includes a first antenna;
   a second device that includes a second antenna; and
   a coupling assistance device configured to communicatively couple to the first antenna and the second antenna, the coupling assistance device including:
      a base that includes a first principal surface; and
      a planar antenna disposed at the base,
   wherein the first principal surface of the base includes:
      a first region configured to have the first device placed thereon, and
      a second region configured to have the second device placed thereon,
   wherein the first region and the second region are positioned at a distance relative to each other such that, when the first antenna is placed adjacent to the first region and the second antenna is placed adjacent to the second region, the first device and the second device are both simultaneously positioned on the first principal surface of the base, and
   wherein the planar antenna extends from the first region of the base to the second region of the base, and is communicatively coupled to the first antenna in the first region and the second antenna in the second region when the first and second devices are placed on the first and second regions, respectively.

16. The RFID communication system according to claim 15,
   wherein the first device is a portable communication terminal and includes:
      a first principal surface;
      a second principal surface opposite the first principal surface of the first device; and
      a display surface disposed on the first principal surface of the first device;

wherein the first antenna is disposed closer to the second principal surface of the first device than the first principal surface of the first device, and wherein the first device is configured to be placed on the coupling assistance device such that the second principal surface of the first device faces the first region.

17. The RFID communication system according to claim 16, wherein:

the second device comprises an outline that is smaller than an outline of the first device, and the second antenna comprises an outline that is smaller than an outline of the first antenna.

18. The RFID communication system according to claim 15, wherein:

a portion of the planar antenna corresponding to the first region includes a first coil with a winding axis that extends in a normal direction of the first principal surface of the base, and region includes a second coil with a winding axis that extends in the normal direction of the first principal surface of the base.

19. The RFID communication system according to claim 18, wherein:

the planar antenna includes the first coil, the second coil, and a connecting portion that connects the first coil to the second coil, and an area of a region defined by the connecting portion is smaller than an area of a region in which the first coil is disposed and an area of a region in which the second coil is disposed.

20. The RFID communication system according to claim 18, wherein the first coil comprises an aspect ratio different from an aspect ratio of the first antenna.

* * * * *